(12) United States Patent
Shelestak

(10) Patent No.: US 6,673,730 B1
(45) Date of Patent: Jan. 6, 2004

(54) INFRARED AND ULTRAVIOLET RADIATION ABSORBING GLASS ARTICLE AND METHOD

(75) Inventor: Larry J. Shelestak, Bairdford, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/458,792

(22) Filed: Dec. 10, 1999

Related U.S. Application Data

(63) Continuation-in-part of application No. 09/058,381, filed on Apr. 9, 1998, now Pat. No. 6,313,053, which is a continuation-in-part of application No. 08/954,722, filed on Oct. 20, 1997, now abandoned.

(51) Int. Cl.[7] ............................................. C03C 3/087
(52) U.S. Cl. ........................................... 501/71; 501/70
(58) Field of Search ...................... 501/70, 71, 904, 501/905, 27

(56) References Cited

U.S. PATENT DOCUMENTS

| | | | |
|---|---|---|---|
| 1,737,685 A | 12/1929 | Rising | 501/65 |
| 1,737,686 A | 12/1929 | Rising | 501/69 |
| 1,924,752 A | 8/1933 | Rising | 501/65 |
| 2,144,943 A | 1/1939 | Sharp et al. | 501/70 |
| 2,397,195 A | 3/1946 | Mook et al. | 501/58 |
| 2,755,212 A | 7/1956 | Brown | 501/17 |
| 3,024,120 A | 3/1962 | Babcock | 501/17 |
| 3,024,121 A | 3/1962 | Hagedorn | 501/71 |
| RE25,312 E | 1/1963 | Duncan et al. | 501/71 |
| 3,206,659 A | 9/1965 | Goodman et al. | 361/280 |
| 3,330,638 A | 7/1967 | Brown | 65/134.3 |
| 3,498,806 A | 3/1970 | Hammer et al. | 501/71 |
| 3,523,779 A | 8/1970 | Keshari et al. | 65/134.3 |
| 3,652,303 A | 3/1972 | Rao | 106/52 |
| 3,672,919 A | 6/1972 | Sack | 501/59 |
| 3,734,701 A | 5/1973 | Pecoraro et al. | 65/27 |
| 3,776,710 A | 12/1973 | Knavish et al. | 65/134 |
| 3,779,733 A | 12/1973 | Rao | 65/32.5 |
| 3,811,854 A | 5/1974 | Pecoraro | 65/27 |
| 3,811,858 A | 5/1974 | Ernsberger et al. | 65/135 |
| 3,811,860 A | 5/1974 | Nier | 65/135 |
| 3,836,349 A | 9/1974 | Knavish | 65/134 |
| 3,837,832 A | 9/1974 | Pecoraro et al. | 65/182 R |
| 3,894,859 A | 7/1975 | Scott et al. | 65/65 A |
| 3,928,014 A | 12/1975 | Knavish | 65/136 |
| 4,001,001 A | 1/1977 | Knavish et al. | 65/337 |
| 4,046,546 A | 9/1977 | Hynd | 65/178 |

(List continued on next page.)

FOREIGN PATENT DOCUMENTS

| | | |
|---|---|---|
| DE | 19636303 | 3/1997 |
| EP | 0 527 487 | 2/1993 |
| EP | 0 555 552 | 8/1993 |

(List continued on next page.)

OTHER PUBLICATIONS

Manring, W. H. et al., "Controlling Redox Conditions in Glass Melting", *Glass Industry*, May 1978, pp. 13–16, 23, 24, 30.

(List continued on next page.)

*Primary Examiner*—David Sample
*Assistant Examiner*—Elizabeth A Bolden
(74) *Attorney, Agent, or Firm*—Andrew C. Siminerio; Kenneth J. Stachel

(57) ABSTRACT

The present invention provides a high redox, ultraviolet and/or infrared absorbing radiation absorbing, and colored glass using a standard soda-lime-silica glass base composition and additionally at least on essential solar absorbing and colorant set of components. The solar absorbing flat glass article has two opposing major surfaces with a thickness of 1.5 to 12 mm. and a redox value in the range of greater than 0.38 to about 0.6, a retained sulfate measured as (SO3) value in the range of greater than 0.005 to less than 0.18 weight percent, and is essentially free of coloration from inorganic polysulfides.

22 Claims, 4 Drawing Sheets

U.S. PATENT DOCUMENTS

| | | | |
|---|---|---|---|
| 4,047,918 A | 9/1977 | Heithoff | 65/179 |
| 4,104,076 A | 8/1978 | Pons | 501/66 |
| 4,138,235 A | 2/1979 | Turner | 65/27 |
| 4,313,747 A | 2/1982 | Barton | 65/27 |
| 4,381,934 A | 5/1983 | Kunkle et al. | 65/135.4 |
| 4,551,161 A | 11/1985 | Savolskis et al. | 65/27 |
| 4,713,359 A | 12/1987 | Lubelski et al. | 501/63 |
| 4,744,809 A | 5/1988 | Pecoraro et al. | 65/135 |
| 4,792,536 A | 12/1988 | Pecoraro et al. | 501/70 |
| 4,866,010 A | 9/1989 | Boulos et al. | 501/71 |
| 4,886,539 A | 12/1989 | Cervitti et al. | 65/134.2 |
| 5,013,487 A | 3/1991 | Cheng | 252/587 |
| 5,006,144 A | 4/1991 | Knavish et al. | 65/134 |
| 5,023,210 A | 6/1991 | Krumwiede et al. | 501/71 |
| 5,030,594 A | 7/1991 | Heithoff | 501/72 |
| 5,069,826 A | 12/1991 | Cheng | 252/587 |
| 5,070,048 A | 12/1991 | Boulos et al. | 501/71 |
| 5,078,777 A | 1/1992 | Cozac et al. | 65/347 |
| 5,112,778 A | 5/1992 | Cheng et al. | 501/31 |
| 5,214,008 A | 5/1993 | Beckwith et al. | 501/69 |
| 5,240,886 A | 8/1993 | Gulotta et al. | 501/70 |
| 5,264,400 A | 11/1993 | Nakaguchi et al. | 501/71 |
| 5,278,108 A | 1/1994 | Cheng et al. | 501/71 |
| 5,308,805 A | 3/1994 | Baker et al. | 501/71 |
| RE34,639 E | 6/1994 | Boulos et al. | 501/71 |
| 5,318,931 A | 6/1994 | Nakaguchi et al. | 501/64 |
| 5,320,986 A | 6/1994 | Taniguchi et al. | 501/70 |
| 5,344,798 A * | 9/1994 | Morimoto et al. | 501/70 |
| 5,346,867 A | 9/1994 | Jones et al. | 501/71 |
| RE34,760 E | 10/1994 | Boulos et al. | 501/71 |
| 5,362,689 A | 11/1994 | Morimoto et al. | 501/70 |
| 5,364,820 A | 11/1994 | Morimoto et al. | 501/71 |
| 5,372,977 A | 12/1994 | Mazon-Ramos et al. | 501/57 |
| 5,380,685 A | 1/1995 | Morimoto et al. | 501/71 |
| 5,385,872 A | 1/1995 | Gulotta et al. | 501/71 |
| 5,393,593 A | 2/1995 | Gulotta et al. | 428/220 |
| 5,411,922 A | 5/1995 | Jones | 501/71 |
| 5,478,783 A | 12/1995 | Higby et al. | 501/27 |
| 5,521,128 A | 5/1996 | Jones et al. | 501/127 |
| 5,523,263 A | 6/1996 | Penrod | 501/27 |
| 5,545,596 A | 8/1996 | Casariego et al. | 501/71 |
| 5,582,455 A * | 12/1996 | Casariego et al. | 296/146.2 |
| 5,593,929 A | 1/1997 | Krumwiede et al. | 507/70 |
| 5,641,716 A | 6/1997 | Higby et al. | 501/27 |
| 5,650,365 A | 7/1997 | Higby et al. | 501/71 |
| 5,674,791 A | 10/1997 | Amundson, Jr. | 501/71 |
| 5,688,727 A | 11/1997 | Shelestak et al. | 501/71 |
| 5,700,579 A | 12/1997 | Jeanvoine et al. | 428/437 |
| 5,723,390 A * | 3/1998 | Kijima et al. | 501/70 |
| 5,747,398 A | 5/1998 | Higby et al. | 501/66 |
| 5,776,845 A | 7/1998 | Boulos et al. | 501/70 |
| 5,780,149 A | 7/1998 | McCurdy et al. | 428/336 |
| 5,780,372 A | 7/1998 | Higby | |
| 5,792,559 A | 8/1998 | Heithoff et al. | 428/437 |
| 5,795,363 A | 8/1998 | Pecoraro et al. | 65/134.4 |
| 5,807,417 A | 9/1998 | Boulos et al. | 65/134.3 |
| 5,851,940 A | 12/1998 | Boulos et al. | 501/71 |
| 5,897,956 A * | 4/1999 | Kijima et al. | 428/426 |
| 5,900,275 A | 5/1999 | Cronin et al. | 427/108 |
| 5,994,249 A | 11/1999 | Graber et al. | 501/71 |

FOREIGN PATENT DOCUMENTS

| | | |
|---|---|---|
| EP | 0 644 164 | 3/1995 |
| EP | 0 677 492 | 10/1995 |
| EP | 0 765 846 | 4/1997 |
| FR | 2672587 | 8/1992 |
| WO | 91/11402 | 8/1991 |
| WO | 94/25407 | 11/1994 |
| WO | 96/28394 | 9/1996 |

OTHER PUBLICATIONS

Simpson, W. et al., "The redox number concept and its use by the glass technologist", *Glass Technology*, vol. 19, No. 4, Aug. 1978, pp. 82–85.

DiBello, P. M., "Controlling the oxidation state of a glass as a means of optimising sulphate usage in melting and refining", *Glass Technology*, vol. 30, No. 5, Oct. 1989, pp. 160–165.

Beerkens, R. et al., "Modeling Explores Bubble Behavior in Molten Glasses", *The Glass Researcher*, vol. 6, No. 2, Winter 1997, pp. 19–25 (no month).

* cited by examiner

INFRARED AND ULTRAVIOLET RADIATION ABSORBING GLASS ARTICLE AND METHOD

CROSS REFERENCE TO RELATED APPLICATION

This application is a continuation-in-part of U.S. application Ser. No. 09/058,381, filed Apr. 9, 1998, now U.S. Pat. No. 6,313,053 which is a continuation-in-part of U.S. application Ser. No. 08/954,722 filed Oct. 20, 1997, now abandoned.

Also this application is related to pending reissue patent application, entitled, "TRANSPARENT INFRARED ABSORBING GLASS AND METHOD OF MAKING" Ser. No. 07/567461, filed Jul. 27, 1990.

BACKGROUND OF THE INVENTION

1. Field of the Invention

This invention relates to infrared and/or ultraviolet radiation absorbing soda-lime-silica glass composition suitable for architectural and automotive glazing applications. The glass article has high redox values greater than 0.38 which makes the article difficult to melt from batch and refine in a horizontal continuous furnace with a melter and refiner. The melter of the furnace is heated at least partially from overhead fossil fuel fired burners and the melted glass moves and advances along as a pool of molten glass maintained in the melter and through the refiner and to a glass forming operation.

2. Technical Considerations

Infrared and ultraviolet radiation absorbing colored glass substrates have a variety of different applications. In particular, such glasses may be used by architects to glaze buildings and by vehicle designers as automotive windows. Besides providing an aesthetically pleasing color, these glasses may also provide enhanced solar performance as compared to conventional clear glass.

Different materials may be added to the glass in order to provide the desired color and spectral performance. For example, iron, cobalt, nickel, selenium, cerium, and titanium, to name a few, are typically added to provide the desired color composition. As materials are added to change color and enhance solar performance, care must be taken to maintain the visible light transmittance and color required for that particular application. It should also be remembered that changing the thickness of the glass affects these spectral properties so that a particular composition which has acceptable color and performance at a particular thickness may not be acceptable at a different thickness. The conversion of these properties to different thickness of glass is discussed in U.S. Pat. No. 4,792,536 to Pecoraro, et al. at column 15 line 59 through column 16 line 7.

One particular blue composition that provides superior spectral performance is disclosed in U.S. Pat. No. 4,792,536 to Pecoraro, et al. Commercial products covered by this patent were sold by PPG Industries, Inc. under the SOLEXTRA® and AZURLITE® trademarks. This glass incorporates a moderate amount of iron in the composition and has a relatively large portion of the glass in the ferrous state, expressed as FeO. In particular, the glass composition includes a basic soda-lime-silica composition and further includes 0.45 to 1 weight percent total iron (expressed as $Fe_2O_3$). At least 35 percent of the total iron is in the ferrous state. The dominant wavelength of these glasses range from about 486 to 489 nanometers ("nm") and excitation purity ranges from about 8 to 14 percent. From a processing standpoint, producing the glass disclosed in this patent with a high ratio of ferrous iron to total iron may require additional processing considerations not typically associated with conventional glass melting operations, as are well known in the art.

Horizontal elongated continuous melting furnaces with several different operational sections for the molten pool of glass leads to forming operations at one end to produce flat glass from batch materials and optionally cullet generally introduced to the furnace at the opposite elongated end. The furnaces melt the batch and any cullet through the application of heat to form a pool of molten glass that flows through the furnace for refining and conditioning into formable melted glass withdrawn for forming flat glass. Furnaces of various design have various heat sources such as overhead fossil fuel fired burners and/or electric heat sources. Fossil-fueled furnaces include regenerative furnaces and recuperative furnaces, and electric furnaces include those as illustrated in U.S. Pat. No. 2,225,616 and U.S. Pat. No. 2,225,617. There are fossil fuel-fired furnaces which include electric-boosting electrodes as shown in U.S. Pat. Nos. 2,397,852, 2,600,490, 2,636,914 and 2,780,891. In general, when both electricity and fossil fuels have been used to provide heat to the same glassmaking furnace, the fossil fuels have been employed to melt glass batch in the region of the furnace where batch is advancing freely through the furnace from its charging kilns. Electrodes have been positioned at various locations in the furnace in order to assist in melting batch, to heat molten glass beyond the region of unmelted batch, and to strengthen the convective flow, known as the "spring zone" flow, within the molten glass as shown in U.S. Pat. Nos. 2,512,761, 2,636,914 and Canadian Pat. No. 634,629, and the like.

The solar absorbing glasses, like those with a high redox value of greater than 0.38 with the higher amounts of the reduced form of iron, ferrous iron, and especially with high iron concentration of greater than 0.45 to 1.5, pose challenges in melting and refining and conditioning in horizontal continuous furnaces. The melting and refining and/or conditioning whether in one, an adjoining, or separate sections or zones of the furnace for the refining and conditioning operations can each experience similar and different upsets and impediments in producing these glasses. Although the higher amount of ferrous iron results in glasses that absorb infrared energy, this higher amount of ferrous iron also provides for low effective thermal conductivity in the glass melt. This leads to a more pronounced temperature gradient in the depth of the pool of melted glass than is encountered with lower redox glass melts. Consequences of such a situation depending on the location within the furnace can result in a much lower tolerance to both changes in temperature and depth of the melted glass pool. Results of these situations can range from bubble defects and/or ream defects or imperfections in the flat glass product to premature glassy formations from the molten glass in the furnace. These defects include gradations for each. For instance the bubble defects range from seed defects to partial and to closed bubble defects that can occur at different locations in the depth of the glass product such as top and bottom bubble defects. The ream defect relates to Rayleigh instability as described in U.S. Pat. No. 3,836,349.

Also one way of achieving a higher redox value in glass is the formation of ferrous iron during melting and/or refining of the glass melt for the solar absorbing glasses through the use of reductants and the removal of oxidizers from the batch and/or cullet ingredients. For the refining of a glass melt in horizontal continuous furnaces having overhead fossil fuel firing, chemical fining agents such as sulfur-containing fining agents generally are used. These fining agents assist in the removal or resolution of gaseous inclusions from or in the melt. The dilemma is that the sulfur-containing fining agents are oxidizers which depending on their amounts can shift the balance of the amount of reduced iron, ferrous iron, to oxidized iron, ferric iron, in the glass melt and product creating difficulties in achieving higher redox values. The reduction or removal of sulfur-containing oxidizing fining agents from the batch ingredients can impede the fining operation of the melted glass. A resolution is needed for the use of sulfur-containing fining agents to obtain high quality glass with minimum defects while at the same time limiting the oxidation of iron to achieve higher redox values for the glass.

The favorable acceptance of the SOLEXTRA product makes it advantageous to produce a type of glass having a similar color and enhanced spectral performance using conventional glass melting furnaces. Also the market may find glasses of other colors such as green, blue-green, green gray, blue grey and grey with good spectral properties to be of value. Also the production of solar performing glasses of these other colors with their higher ferrous content could benefit from more facile production processes in more conventional melting furnaces in a manner similar to that for a type of glass like the SOLEXTRA glass.

An object of the present invention is to produce quality tinted or colored glass with superior spectral performance from a horizontal continuous furnace having overhead fossil fuel fired burners.

2B. Patents of Interest

U.S. Pat. No. 3,652,303 to Janakirama Rao discloses a blue, heat absorbing glass which incorporates low amounts of iron and uses tin to convert and retain a significant portion of the iron in the ferrous state, and in particular more than 80% of the iron is retained in the ferrous state.

U.S. Pat. Nos. 4,866,010 and 5,070,048 to Boulos, et al. disclose blue glass compositions with a colorant portion iron and cobalt and further including nickel and/or selenium. The glasses have a dominant wavelength of 482 nanometers (nm) ±1 nm and a color purity of 13% ±1%.

U.S. Pat. Nos. 5,013,487 and 5,069,826 to Cheng disclose blue colored glass compositions which include iron, titanium, tin and zinc as colorants. The glasses have a dominant wavelength ranging from 485 to 494 nm and a color purity of 5 to 9%.

U.S. Pat. No. 5,344,798 to Morimoto, et al. discloses a blue glass composition which includes iron, cerium, titanium, zinc, cobalt and manganese. These glasses have a dominant wavelength of 495 to 505 nm and a color purity of 5 to 9%.

SUMMARY OF THE INVENTION

The aforementioned object and resolution of the dilemma is accomplished by the type of glass and method of making it provided by the present invention. The solar absorbing glass has a high performance ultraviolet and/or infrared absorbing soda lime float glass composition. The glass has a higher iron content of greater than 0.4 and up to 2 weight percent of the glass composition, and has a redox ratio in the range of greater than 0.38 to about 0.65. The retained $SO_3$ content where sulfur is in +6 oxidation state is less than 0.18 weight percent of the glass. This glass is essentially free of amber coloration from inorganic polysulfides, and is produced from melting and refining under controlled temperature, residence time, and environmental conditions where the batch composition comprises: soda lime silica glass forming batch materials, an essential solar radiation absorbing and colorant forming portion, at least one sulfur-containing fining agent and at least one reducing agent in a controlled ratio of one to the other. The relatively low level of dissolved sulfur-containing fining agent in the melt is compensated for by controlling the time-temperature integral of melting and refining which is greater than that for a lower redox glass. Optionally high iron cullet is added in an amount in the range of around 25 to around 75 weight percent of the batch. The controlled ratio of at least one sulfur-containing fining agent to reducing agent can be in the range of about 2.4 (pref 3.5) to about 4.5 when salt cake is the at least one sulfur-containing fining agent and coal is the reducing agent and the time temperature integral is modified by one or more of the following controlled melter and refiner operations:

For the melter:

a) a higher temperature of melting than for lower redox (less than 0.38) glasses to assist in containing batch melting more upstream in the melter for instance through a different burner firing pattern and aggressive use of bubblers;

b) use of cullet with the batch for melting where the cullet is present in the range of weight percent for the batch from 20 to 80 percent and the cullet can be selected from high redox cullet with a redox ratio from 0.5 to 0.7 and from clear cullet and mixtures thereof, where lower amounts of cullet utilized with the batch usually involve cullet with a higher redox ratio;

c) reduction of the temperature of glass melt entering the refiner portion of the furnace by up to 70° F. (21° C.) for instance with utilization of glass cullet with a high redox ratio in the range of 0.5 to 0.7 with the batch ingredients of 20 to 80 weight percent;

d) maintaining appropriate temperature gradient in the melt for strong convection currents for improved heat transfer and homogeneity of the melted glass;

e) increase residence time or melting temperature in the melter when the batch feed ingredients to the melter have lower amounts, around 20 weight percent of clear cullet, as opposed to the use of greater than 40 percent high redox cullet;

f) maintain the upstream melter bottom temperature at least above the liquidus point of the glass composition through electrode heating of the bottom or aggressive use of bubblers to assist in heat transfer through the pool of melted glass;

f) avoid defect density of bubbles by 1) major reduction of glass temperature entering the waist or the beginning of the refiner if a waist is not present, or 2) providing an oxidizing atmosphere above the glass in the down-tank port before the waist or the beginning of the refiner, or For the refiner:

a) provide front end firing at a temperature less than that which causes reboil bubbles to retard the surface glass from cooling and increasing in density and sinking in the pool of melted glass;

b) provide controlled cooling in the refiner to obtain more laminar flow of the melt to avoid ream-induced distortion from the IR absorption properties of the reduced glass through an appropriate cooling configuration from the waist or the beginning of the refiner if no waist is present through the forming canal or entrance in order to avoid the formation of Rayleigh roll cells, (one approach is to cool the under glass temperature by submerged coolers), c) maintain a temperature of the refined melted glass removed for formation into flat glass with two opposing major surfaces and a consistent thickness between them in the range of 1 to 12 millimeters ("mm") such that the downstream refiner bottom temperatures are greater than the liquidus temperature for the glass;

d) optionally utilize one or more longitudinal heat extracting members positioned transverse to the direction of flow of the pool of molten glass to conserve melter temperature by restricting flow at the surface and/or extracting heat in the pool of melted glass in the refining section at selected discrete regions of the pool;

One aspect of the present invention provides a blue colored glass using a standard soda-lime-silica glass base composition and additionally iron and cobalt, and optionally chromium, as the essential solar radiation absorbing material and colorant portion. In particular, the blue colored glass includes as the essential solar radiation absorbing and colorant portion about 0.40 to 1.0 wt % total iron, preferably about 0.50 to 0.75 wt %, about 1 to 40 PPM CoO, preferably about 4 to 20 PPM, and 0 to 100 PPM $Cr_2O_3$. In one particular embodiment the redox ratio for the glass of the present invention has between about 0.50 to 0.55, a luminous transmittance of at least 55 percent and a color characterized by a dominant wavelength of 485 to 489 nanometers and an excitation purity of about 3 to 18 percent. In another embodiment of the invention, the glass has a luminous transmittance of at least 65 percent at a thickness of about 0.154 inches (3.9 mm) and a color characterized by a dominant wavelength of 485 to 492 nanometers and an excitation purity of about 3 to 18 percent.

The method of the present invention involves: feeding glass-making ingredients for high redox soda lime silica glass with essential colorant and solar radiation absorbing formation materials having one or more sulfur-containing fining agents and one or more carbonaceous reducing agents wherein the ratio of the former to the latter is in the range of about 3.5 to about 4.5 along with cullet into a glass melting furnace, melting the ingredients at higher temperatures than low redox glass melt less than 0.38, controlling the time temperature integral with controlled cooling from the hot spot to assist refining in the refiner and to minimized the formation of ream imperfections in the glass and remove at least a portion of the refined melted glass for formation of flat glass articles with two opposing major surfaces and a consistent thickness ranging from around 1 to around 12 mm between these major surfaces. The furnace has melting and refining sections wherein a large portion of the heat is applied to the ingredients from over the melt by fossil fuel fired burners to melt the same and form a pool of molten glass at least a portion of which flows from the melting section of the furnace to the refining section thereof to be refined and at least a portion of the refined glass flows to exit end of the furnace where molten glass is continuously removed to a flat glass forming operation. Temperature gradients exist in the pool of molten glass in the refining section from the top surface to the bottom surface of the pool of molten glass wherein the temperature gradients cause (1) convection flow of a portion of the pool of molten glass along a generally circuitous path having a downstream direction adjacent the top surface of the mass of molten glass in the refining section and the upstream direction adjacent the bottom surface of the pool of glass in the refining section; and (2) convolutions in the pool of molten glass adjacent the top surface of the pool of molten glass in the refining section. The controlled cooling is accomplished by one or more of the following steps:

heating the upper portion of the pool of melted glass as the upper surface enters the refiner;

disposing a first member or set of members for extracting heat in the pool of molten glass in the waist or front of the refining section as a discrete region along the circuitous path in the upstream flow transverse to the direction of flow of the pool of molten glass;

extracting heat by way of the first heat extracting member from each of the discrete regions as the molten glass moves past the region wherein the rate of flow of the pool of glass as it moves past the regions is reduced;

disposing second member or set of members for extracting heat from under the surface of the molten pool of glass in the refiner;

extracting heat by way of the second heat extracting member from the pool of molten glass as the pool of the molten glass moves along the upstream portion of the circuitous path;

Performing the extracting steps to extract heat from the pool of glass as it moves along the circuitous path to alter the temperature gradients such that the convolutions in the pool of molten glass are minimized.

DETAILED DESCRIPTION OF THE INVENTION

Reference to U.S. Patents and any journal articles herein are hereby incorporated by reference for all that they teach and describe. Also for FIGS. 1 and 2 the same reference numbers are employed for the same item depicted in both Figures.

Figure 1:
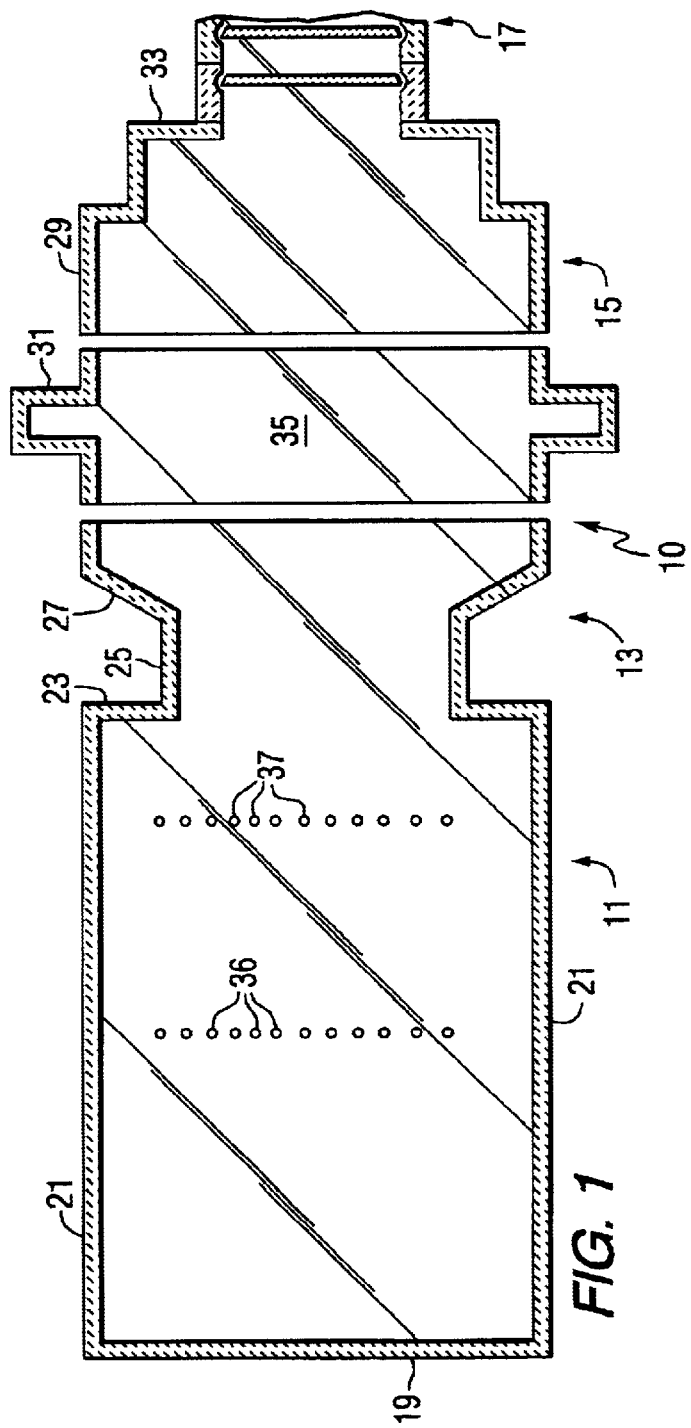
FIG. 1 is a cross sectional plan of a horizontal glassmaking furnace having a waist illustrating the location of a row optional of glass stirrers in that waist.
Figure 2:
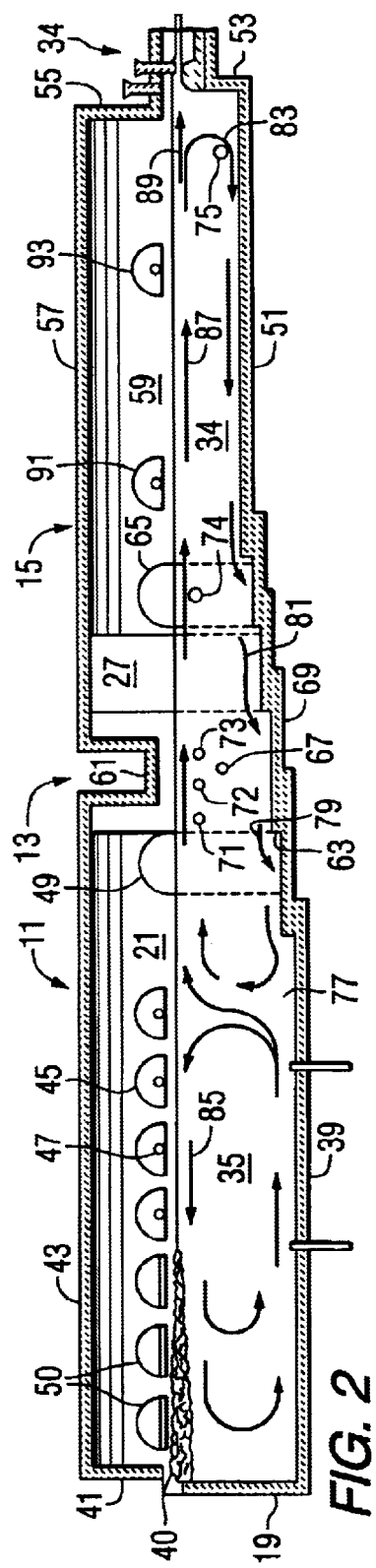
FIG. 2 is a schematic sectional longitudinal elevation view of a glassmaking furnace useful in the method and production of glass of this invention.

In accordance with this invention, there is provided a method for producing flat glass articles and the articles themselves from a high iron, IR absorbing glass composition as a solar performing glass composition, i.e., a glass composition can have a melting temperature of at least 2400° F. (1316° C.), in a continuous tank-type flat glass-producing furnace. As shown in FIGS. 1 and 2 a glassmaking furnace 10, for example a regenerative glassmaking furnace having a melter 11, an optional waist 13 and a refiner/conditioner 15 is connected to a delivery facility 17 for delivering refined and conditioned molten glass to a flat glass forming chamber, not shown. The glassmaking furnace includes a back wall 19, side walls 21 and can include corner walls 23. All of these walls in FIG. 1 are illustrated at an elevation cutting through the basin wall section just at or above the elevation of the upper surface of a pool of molten glass maintained in the furnace. Therefore, the side firing ports on a typical side-fired, regenerative furnace do not appear in FIG. 1.

The waist includes waist side walls 25 and tapered walls 27 leading to the refiner 15. The furnace can also be essentially free of a waist but the melter and refiner are usually separated by some narrowing of the width between them or the presence of a canal (not shown) from the melter to the refiner. The refiner can include side walls 29, optionally doghouses or skim kilns 31 and a front wall 33. A pool of molten glass 35 is contained within the glassmaking furnace 10. Unmelted raw glass batch material including any cullet 40 is fed to the furnace 10 at the left end by any method known to those skilled in the art as in U.S. Pat. No. 3,836,349. There will be a floating layer of unmelted batch materials 40 on the surface of this pool of molten glass 35. Such a layer of batch materials should not extend too far along the elongated length of the melter 11. Preferably the temperature of the melter in the upstream region is sufficient so that floating batch 40 does not extend down the length over the bubblers.

In FIG. 2, the furnace 10 includes a melter bottom 39, connected to back basin wall 19 and melter side walls 21. The side walls 21 include conventional lower basin wall and upper breast wall portions (unnumbered). The furnace further includes an upper or suspended back wall 41 and a roof or crown 43. In the waist region 13, the waist crown 61 preferably is spaced relatively closely to the upper surface of the pool of molten glass 35.

The furnace is an elongated one as seen in FIGS. 1 and 2 and it has a plurality of firing ports 45 through its elongated side walls 21 as shown in FIG. 2. These ports 45 can be and preferably are connected to regenerators (not shown) on either side of the furnace. Extending into each firing port 45 which is to be fired is a burner 47 through which gas, oil or other hydrocarbon fuel with or without oxygen enrichment may be directed for combustion at the tip of the burner 47. Preheated air can enter the furnace headspace through the ports 45 around the burners 47. The air can be preheated by passing through the regenerator on one side of the furnace in the conventional way as only the burners on that side are fired at a given time. The products of combustion can be exhausted from the furnace through its ports and regenerator on the opposite side from that where firing is accomplished. Firing can be periodically reversed from side to side in the usual way. The firing ports 45 in the upstream end of the melter 11 can be provided with dampers 50 to isolate the headspace at that end of the furnace from any regenerators.

The furnace generally can be and preferably is provided with skim kilns 49 near the downstream end of the melter 11. The terms "upstream" and "downstream" refer to the general direction of glass flow through the furnace so that for FIGS. 1 and 2 the left side is the upstream end and the right side is the downstream end of the furnace.

The melting temperature of the glass is the range of furnace temperatures within which melting takes place at a commercially desirable rate and at which the resulting glass generally has a viscosity of $10^{1.5}$ to $10^{2.5}$ poises. For the purposes of comparing glasses, it is assumed that the glass at its melting temperature has a viscosity of $10^{2.0}$ poises. The solar performing glasses that absorb IR conduct heat less efficiently than lower redox value glasses and have greater temperature gradients in a pool of melted glass. Higher melting temperatures are used in conjunction with auxiliary heat distribution approaches to adequately melt the solar performing glasses. Accordingly, as used in the claims, unless otherwise indicated, the terms "melting temperature for the solar performing glass' means a glass which at a viscosity of $10^{2.0}$ poises has a melting temperature of at least 2400° F. (1316° C.), preferably 2550° to 2600° F. (1398 to 1427° C.) In order to practice the invention, the solar performing glasses should also be formed at a relatively higher temperature. The forming temperature can be within up to around 800° F. (427° C.) of the melting temperature. Preferably the forming temperature is around 2050 to around 2100° F. (1121 to 1149° C.) so that the difference between the melting temperature and forming temperature 700° F. (371° C.) or less. The forming temperature of the glass being defined as the temperature at which the glass has a sufficient viscosity so as to be able to be formed by conventional forming means into a shape-retaining object, for example, to be continuously formed into a ribbon. If the forming temperature is too high (and viscosity too low), the glass will wet the rolls and freeze in forming. If the forming temperature is too low and viscosity too high, high stresses will be imposed in the glass resulting in fracturing. Glasses prepared in accordance with the present invention generally can have forming viscosities of about $10^4$ poises or lower, usually in the range of $10^4$ to $10^{3.25}$ poises, and corresponding forming temperatures of 1700° F. or higher, usually within the range of 1700° to 2100° F. (926 to 1149° C.) The batch is usually completely melted by the first four rows of burners, the remaining burners serve to keep the glass molten as it advances through the melting zone. As can be seen in FIGS. 1 and 2, the rows of overhead burners extend over substantially the entire length of the furnace. Instead of overhead burners, heating could be by regenerative firing in which ports opening into the furnace above the level of melted glass flowing therein are positioned or arranged in intervals on both sides of the furnace. Firing can be conducted first on one side of the furnace and then on the other. With the higher forming temperatures more cooling than with low redox value glasses may be performed during the forming operation.

As shown in FIGS. 1 and 2 a plurality of bubbler tubes 36 which may, for example, extend through the bottom 39 of the furnace may be provided for this purpose. The bubblers 36 are shown in at least one straight row or a plurality of rows 36 and 37 extending substantially across the width of the furnace as shown in FIG. 1, but it should be understood that more than one row may be used and that a linear arrangement although not necessary is preferred. The number and spacing of the bubblers 36 and 37 is dependent upon the degree to which the injected gas is to be dispersed in the melt. The need to introduce the gas in a dispersed manner depends upon the extent to which the normal operation of the furnace homogenizes the melt. If strong convection currents are maintained by other means in the furnace, for example with the use of electrode heating, only a few widely spaced bubblers may be necessary. Otherwise, a larger number of bubblers is needed to improve the heat transfer in the melt of the more refractory and nonconducting solar performing glass. Theoretically, the number of bubblers would preferably be as large as possible, but is limited by the inconvenience and cost of installation. The gas introduce to the melt can be air or nitrogen or the like or mixtures thereof. Also it is possible to add reducing type gases such as carbon-containing substances, like hydrocarbon fuels such as methane or propane and materials such as carbon monoxide as more fully discussed in U.S. Pat. No. 5,006,144. It should be understood that the description of the gas refers to its state at furnace operating conditions and that it need not be gaseous at standard conditions. It should be understood that creation of bubbles of gas in the molten glass is not necessary. In fact, it may be preferred to diffuse the gases as much as possible. Thus, an alternative mode of introducing the gas into the melt is to pass the gas through a porous refractory member submerged in the melt or forming part of the furnace bottom. The gas is delivered to the melt in a manner more aggressive than in melting lower redox, clear or oxidized glasses. The aggressive operation includes up to around 25 percent increased gas flow to the melt. Conventional bubblers traditionally are operated in such a way that around 3 to 4 cubic feet of air or other gas escapes each hour through each orifice into the melt, and 12–15 such orifices may be used across a 30 foot width of a tank producing around 400 tons of glass per day. With the aggressive use of the bubblers 4 to 7 more suitably 4 to 6 cubic feet of air or gas per hour can escape into the melt. Other types of bubblers that can be used include are described the following U.S. Pat. Nos.: 2,261,034; 2,387,222; 3,558,297; 2,274,643; 3,414,396; 3,104,967; 3,198,618; 3,305,340; 2,909,005; 3,375,095; 3,463,626; 3,239,324; 3,294,512; 3,330,639; and 3,294,509.

The refiner 15 includes a refiner bottom 51, a front basin wall 53, an upper front wall 55, a roof or crown 57 and side walls 59. The melter 11 and refiner 15 are joined through a bridge wall 61 and waist or tapered wall sections 63. The refiner 15 may be provided with skim kilns 65. Joining the melter bottom 39 and refiner bottom 51 is a bottom section which can include one or more or a combination of steps 67 and planes 69. The heights of the one or more and preferably a plurality of steps and lengths of the planes are designed to aid in the establishment of desirable flows in the pool of glass 35 which resides in the lower portion of the furnace. Alternatively the one or more steps can be a sloped plane surface to connect the melter bottom 39 to the refiner bottom 51.

Heat extracting members such as coolers 71, 72, 73, 74 and 75 may be disposed across the furnace and submerged in the glass in the manner shown in U.S. Pat. No. 3,836,349 in order to regulate the flow of molten glass within the furnace. Preferably cooling members like these coolers are provided for reducing the temperature of the forward flow of molten glass in the upstream region of the narrow remainder of the tank. Submerging at least two elongated coolers in the glass mass in a flat-glass melting tank, downtank of the spring zone, with or without additional cooling techniques results in the glass mass being more stable in its internal-flow characteristics than could possibly be predicted, and the internal quality and/or throughput are materially improved. Reduced, if any, convolutions occur, and if they occur, their magnitude is materially reduced, and they can be eliminated by modifying the applied cooling.

Each submerged cooler may comprise concentrically arranged stainless steel pipes. For example, each of the coolers may comprise a 2-inch-diameter inner pipe and a 3-inch-diameter outer pipe, wherein cooling water is fed into the inner pipe and withdrawn from the outer pipe. The rate at which the cooling water is passed through each cooler is largely a matter of choice, with flow rates on the order of about 50 to about 80 gallons per minute being typical. Typical cooling-water temperature rises are from about 25° to about 35° Fahrenheit, with inlet temperatures normally ranging from about 80° to about 135° Fahrenheit. Any of the submerged coolers may be placed in either the return or forward convection currents, with placement of both in the return current being preferred. In addition, it is preferred that each cooler extend across substantially the entire width of the furnace 10. In this latter regard, the practical limitations of extending an elongated cooler from one side of the furnace 10 to the other indicate that each cooler should be comprised of a set of two halves, such that each half is inserted into the molten glass from an opposite side of the furnace. It is not necessary that the proximal ends of the cooler halves actually contact each other, so long as the set of cooler halves traverses substantially the entire width of the furnace 10. The cooling capacity of the submerged coolers may be the same or different, and each cooler (or set of cooler halves) may vary in a furnace about 30 feet wide from a minimum capacity of about $1.0 \times 10^6$ BTU/hr. In one embodiment, each of the coolers (or sets of coolers) is operated at about the same cooling capacity, the capacity generally ranging from about $1.0 \times 10^6$ to about $2.5 \times 10^6$ BTU/hr. In another embodiment, each cooler can be operated to extract about $1.8 \times 10^6$ BTU/hr. Suitable coolers can be fabricated from AISI Type 446 stainless steel, with each half inner pipe having a 2-inch outside diameter and an outer pipe having a 3-inch outside diameter. The closed end of each half can have a rounded, machined cap of AISI Type 446 stainless steel.

Optionally one or more homogenizing members are provided for homogenizing the forward flow of glass in the upstream region of the narrow portion of the furnace 10 or waist. The same members may be any known to those skilled in the art for cooling and/or stirring molten glass. For instance the same members can be used for both cooling and homogenizing. Preferably several stirrers 67 are located in the waist which can be stirrers like those of U.S. Pat. No. 4,047,918 described in greater detail below. Extending upwardly at each side of the stirrers in the waist there can be vertical structural members (not shown in FIGS. 1 and 2). These can be connected to a lower, horizontal, cross support beam and an upper, longitudinal support beam (not shown in FIGS. 1 and 2). An upper, cross support beam can be connected, in turn, to the longitudinal beam (not shown in FIGS. 1 and 2). Mounted on the vertical structural members and extending across the waist can be a hose and pipe support beam (not shown in FIGS. 1 and 2).

For instance, the members for homogenizing the forward flow of molten glass can comprise one or more bank of stirrers, where each bank contains one or more stirrers mounted side by side within the deep part of the remainder of the tank for rotation about vertical axes. Such stirrers can be connected to drive means and arranged to stir the molten glass so that at least in one position in each revolution of the stirrers there is no angular difference between the rotational settings of the stirrers in any one bank. The position where the angular difference is zero may be different for each bank of stirrers, when more than one bank is provided.

The stirrers may include blades or paddles or extensions normal to the axis of the stirrer such as vertical extensions for a stirrer with a horizontal azis and vice versa for stirrers with vertical axes. The stirrers in any bank may be arranged to rotate in the same direction so that the blades, paddles, and/or extensions of different stirrers remain parallel to each other during rotation and in this case the stirrers are maintained in phase. If the stirrers in any bank are rotated in opposite directions they are arranged so that all the blades, paddles, and/or extensions become parallel to each other at one predetermined position during each revolution so that there is no difference in rotational setting at that position. Alternatively the stirrers may comprise cylindrical members, such as cylindrical stalks, which are symmetrical about the axes of rotation. In this case the stirrers do not exhibit rotational differences of rotational settings regardless of their rotational positions. Also the stirrers can be elliptical stirrers which reciprocate horizontally through the glass melt in a ellipsoidal pattern such as Guinard stirrers with or without normal extensions. In all cases the stirrers are designed so that they do not impart to the glass a substantial vertical component of glass flow.

Figure 4:
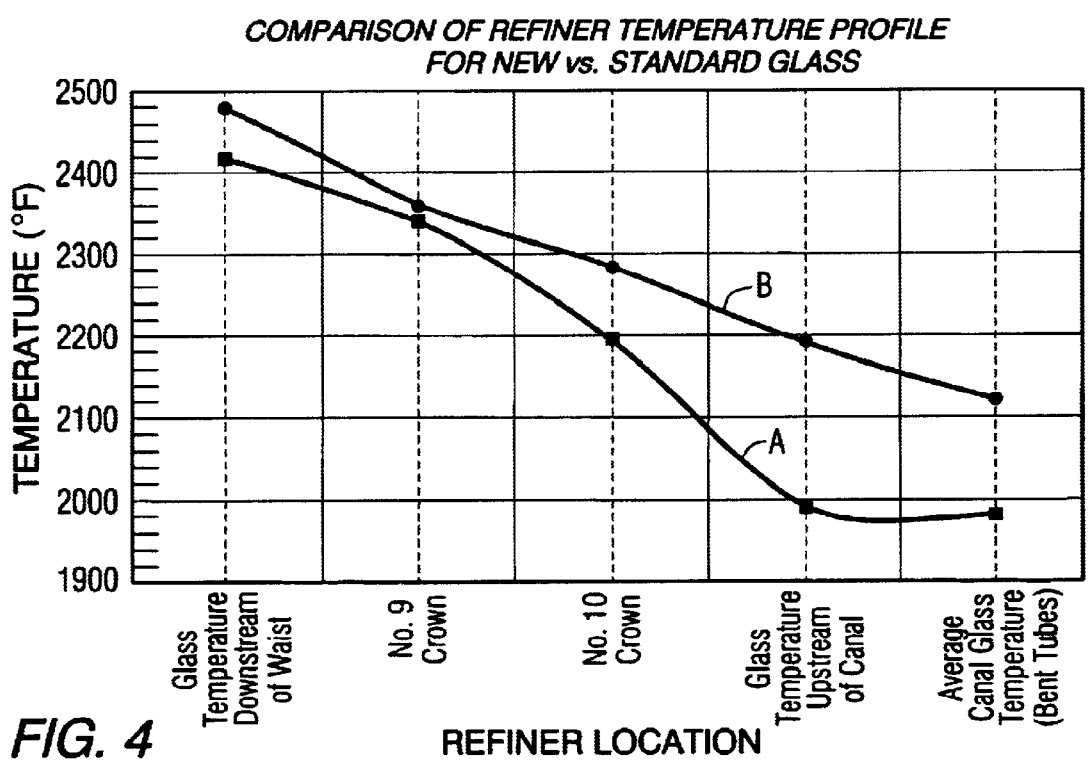
FIG. 4 shows controlled cooling schedules for the refiner of a furnace as in FIG. 1 at curve A for a conventional low redox flat glass composition in a refiner and for Curve B for a high redox glass composition.

Additionally the refiner 15 can have one or more front end firing type of burners similar to those in the melter. These burners function to retard a higher heat loss and reduction in temperature of the surface of the molten bath to decrease the formation of defects. Preferably two pairs of front end firing burners 91 and 93 are placed as shown in FIG. 2. With the use of the front end firing and the coolers and optionally the stirrers in the refiner the reduction in temperature of the molten glass from that at the point of the entry of the molten glass into the refiner to the canal is more gradual. This gradual reduction is different from that of a standard soda lime silica float glass, and the temperature profile for the refiner is shown in FIG. 4. It is important to take into account the temperature and flow rate of the gas supplied, making sure that the surface of the melted glass is not heated or cooled by too much. For instance use of a pair of burners that have outlets located in the side walls of the refiner on opposite sides of the refiner can have jets coming from outlets that are provided with combustion gases from 2000 standard cubic feet per hour of natural gas and 30,000 standard cubic feet per hour of air. This control assists in the avoidance of the development of unwanted disturbances in the flows of the molten glass contained within the refiner, as evidenced by no detectable increase in "ream" in the product glass attributable to the front-end firing operation.

Glass batch materials 40 are charged into the furnace over its back basin wall 37. After the batch materials 40 are pushed beneath the suspended back wall 41, they advance freely along the surface of the pool of molten glass 35. The melter may utilize electrodes for heating which can be mounted in the furnace in several ways. As shown in U.S. Pat. No. 4,001,001 any or all of the illustrated groups of electrodes may be provided.

The major molten glass flow streamlines are illustrated in FIG. 1. A "spring zone" 77 is established in the melter 11 at about the location of maximum glass temperature in the vicinity of the last fired port. The "spring zone" is a region of upward convective flow in the pool of molten glass. Downstream of the spring zone the convection flow of glass has a return flow stream along the bottom of the furnace as illustrated by streamlines 79, 81 and 83, while upstream of the spring zone there is a return flow 85. Moving away from the spring zone in a downstream direction is the major flow stream 87 including the throughput component of flow 89 which continues out of the furnace as it is delivered for forming. As will be seen below, these flows are important to the present process for they serve to distribute the heat introduced into the furnace to all the glass in the furnace.

The molten glass passes from the melting zone into a refining zone where heat is also supplied above the molten glass. This heat from front end firing burners like those in the melter keep the surface of the throughput glass from cooling to much or to rapidly. These front end burners should not be used too much to the extent to cause reboil bubbles in the melted glass. In the refining zone bubbles of gas still remaining in the glass are encouraged to escape or go into solution in the glass. The glass passes from the refining zone into a conditioning zone adjacent the working end of the tank. In the conditioning zone the glass is homogenized and brought to a suitable thermal condition for use in the forming process. Normally a canal leads from the working end of the tank to a forming process such as a float bath operation. While it might be possible to increase the throughput somewhat by increasing the amount of surface cooling in the refiner, it is important to note that the amount of surface cooling for these solar performing glasses can be a factor in causing a condition of instability to occur in the molten glass, known as Rayleigh instability. When such Rayleigh instabilities occur, convolutions are formed in the molten glass. These convolutions manifest themselves as defects in the internal quality of the flat glass which is being produced. These defects are generally referred to as convoluted "striae" and are a form of "ream."

In practice, it has been found that the occurrence or development of the above described Rayleigh instabilities may be predicted with considerable accuracy by calculating for the molten glass a Rayleigh number, in accordance with an equation given hereinbelow. Thus, for molten glass, it can be calculated on theoretical grounds that even with perfectly homogeneous glass, instabilities of the kind mentioned above will occur when the Rayleigh number is greater than about 1,100, and practical experience with molten glass confirms this. Instabilities may occur at Rayleigh numbers less than 532 because of chemical heterogeneities in the glass. It is desirable to operate with a Rayleigh number as low as possible.

The Rayleigh number can be determined by the following equation:

$$\text{Rayleigh No.} = \rho^2 \times d^3 \Delta T \times \beta \times g \times C_p / \kappa \times \eta$$

where X is a symbol for multiplication and not a character.
where
  rho=density of the glass, in grams per cubic centimeter;
  d=depth of temperature-inversion point below the surface, in centimeters;
  DELTA T=T s−T i , in degrees Centigrade;
  T s=surface temperature of the glass, in degrees Centigrade;
  T i=temperature at the point of inversion, in degrees Centigrade;
  beta=coefficient of thermal expansion of the glass, in reciprocal degrees Centigrade;
  g=gravitational acceleration in centimeters per second per second;
  c p=specific heat of the glass, in calories per gram per degree Centigrade;
  kappa=effective thermal conductivity of the glass, in calories per centimeter-second-degrees Centigrade; and
  eta=viscosity of the glass, in grams per centimeter-second.

With respect to the above equation and its relationship to surface cooling of molten glass, it will be appreciated that surface cooling, in any substantial amount, will result in the surface of the glass being at a temperature, T s , which is lower than the maximum temperature, T i, beneath the glass surface. In this situation, there is a temperature gradient in the glass and the maximum temperature, T i, is located a certain distance, d, beneath the surface of the glass. The point at which the maximum temperature is located is generally referred to as the temperature-inversion point. As can be seen from the above equation, the Rayleigh number varies directly with the temperature difference T s–T i, and with the third power of the depth, d, of the temperature-inversion point. Accordingly, any increase in the temperature difference T s–T i and/or the depth, d, of the temperature-inversion point will increase the Rayleigh number and thereby increase the likelihood of Rayleigh instabilities. In this latter regard, it will be noted that both T s–T i and d are increased with increased application of cooling to the surface of molten glass.

Figure 3:
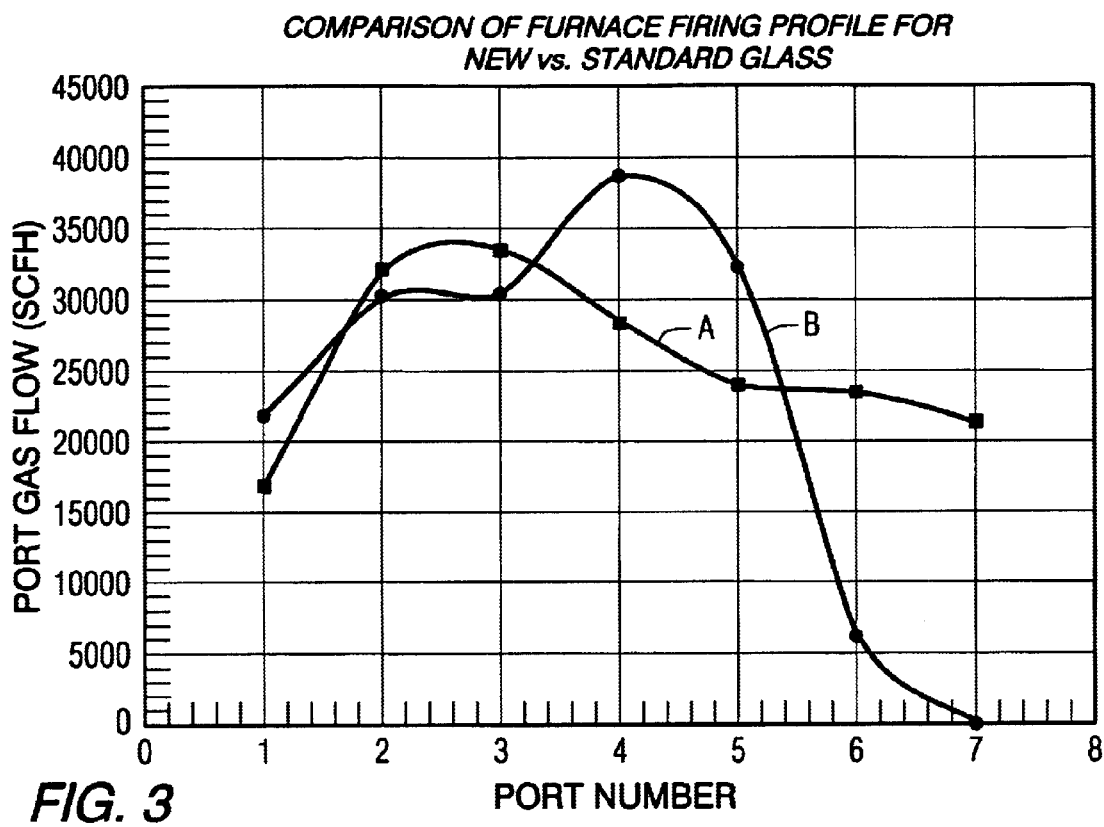
FIG. 3 shows heating schedules for the furnace of FIG. 1 at curve A for a conventional low redox flat glass composition in a furnace and for Curve B for a high redox glass composition.

FIG. 3 shows the firing profile of the burners in the melter 11 for the solar performing glass compositions at curve B opposed to the standard soda lime silica float glass compositions at curve A. The higher melting temperatures in the upstream or uptank portion of the melter 11 for curve B are shown with the higher portion of the curve B at ports 1 and 4 but a lower gas flow and temperature for ports 2 and 3. At port 4 the gas flow and temperatures are significantly higher than those for the standard glass composition. Also in the downtank or downstream portion of the melter the gas flow is reduced significantly for the solar performing glass to decrease the temperature of the glass melt entering the waist and/or to have an oxidizing atmosphere in this portion of the melter.

FIG. 4 shows the temperature profile for the refiner at various locations along the length of the refiner for standard soda lime silica float glass and a solar performing high redox glass. The contolled temperature reduction is more gradual for the high redox glass from a higher temperature when the melt enters the refiner to a higher forming temperature. Of the five temperature measurements, the first and fourth are for glass temperature and the second and third are for crown temperature of the refiner and the last is for forming canal.

The base glass composition of the solar performing glass of the present invention is commercial soda-lime-silica glass characterized as follows:

|  | Weight Percent |
| --- | --- |
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |

Solar properties can include a luminous transmittance (LTA of greater than 60 percent, preferably greater than 70% and most preferably greater than 71%; and a total solar energy transmittance of less than around 50 (solar performing glass) and most preferably less than 45% and most preferably less than 44%.

As used herein, all "weight percent (wt %)" values are based on the total weight of the final glass composition.

To this base glass, the present invention adds essential infrared and/or ultraviolet radiation absorbing materials and colorants in the form of iron and cobalt, and, optionally, chromium. As disclosed herein, iron is expressed in terms of $Fe_2O_3$ and FeO, cobalt is expressed in terms of CoO, and chromium is expressed in terms of $Cr_2O_3$. It should be appreciated that the glass compositions disclosed herein may include small amounts of other materials, for example melting and refining aids, tramp materials or impurities. It should be further appreciated that in one embodiment of the invention, small amounts of additional materials may be included to color the glass and/or improve its solar performance, as will be discussed later in more detail. The composition can have one or more minor colorants that may affect the color of the glass article to an extent less than around 5 nanometers for the dominant wavelength according to the CIE scale.

The iron oxides in a glass composition perform several functions. Ferric oxide, $Fe_2O_3$, is a good ultraviolet radiation absorber and operates as a yellow colorant in the glass. Ferrous oxide, FeO, is a good infrared radiation absorber and operates as a blue colorant. The total amount of iron present in the glasses disclosed herein is expressed in terms of $Fe_2O_3$ in accordance with standard analytical practice, but that does not imply that all of the iron is actually in the form of $Fe_2O_3$. Likewise, the amount of iron in the ferrous state is reported as FeO, even though it may not actually be present in the glass as FeO. In order to reflect the relative amounts of ferrous and ferric iron in the glass compositions disclosed herein, the term "redox" shall mean the amount of iron in the ferrous state (expressed as FeO) divided by the amount of total iron (expressed as $Fe_2O_3$). Furthermore, unless stated otherwise, the term "total iron" in this specification shall mean total iron expressed in terms of $Fe_2O_3$, the term "$Fe_2O_3$" shall mean iron in the ferric state expressed in terms of $Fe_2O_3$ and the term "FeO" shall mean iron in the ferrous state expressed in terms of FeO.

CoO operates as a blue colorant and a weak infrared radiation absorber in the glass. $Cr_2O_3$ may be added to impart a green color component to the glass composition. In addition, it is believed that the chromium may also provide some ultraviolet radiation absorption. A proper balance between the iron, i.e. ferric and ferrous oxides, and cobalt, and optionally chromium, content is required to obtain a glass with the desired blue color and spectral properties.

Se is an ultraviolet and infrared radiation absorbing colorant that imparts a pink or brown color to soda-lime-silica glass. Se may also absorb some infrared radiation and its use tends to decrease redox. CoO operates as a blue colorant and does not exhibit any appreciable ultraviolet or infrared radiation absorbing properties. $Cr_2O_3$ imparts a green color to the glass and helps control the final glass color. It is believed that the chromium may also provide some ultraviolet radiation absorption. $TiO_2$ is an ultraviolet radiation absorber that operates as a colorant imparting a yellow color to the glass composition. A proper balance between the iron, i.e. ferric and ferrous oxides, chromium, selenium, cobalt and optionally titanium content is required to obtain the desired green colored privacy glass with the desired spectral properties.

Alternative compositions of essential solar absorbing and coloring components can be utilized and these include the following.

A green colored, infrared and ultraviolet absorbing glass article having a luminous transmittance of up to 60 percent having in addition to the base glass the essential solar absorbing and colorant portion of iron, cobalt, selenium, and chromium, and optionally titanium. These glasses can have a color characterized by a dominant wavelength in the range of about 480 to 565 nanometers, preferably about 495 to 560 nanometers, with an excitation purity of no higher than about 20%, preferably no higher than about 10%, and more preferably no higher than about 7%. The glass compositions may be provided with different levels of spectral performance depending on the particular application and desired luminous transmittance.

In one embodiment of the invention, the glass composition of a green colored, infrared and ultraviolet radiation absorbing soda-lime-silica glass article includes a solar radiation absorbing and colorant portion having about 0.60 to 4 percent by weight total iron, about 0.13 to 0.9 percent by weight FeO, about 40 to 500 PPM CoO, about 5 to 70 PPM Se, about 15 to 800 PPM $Cr_2O_3$, and about 0.02 to 1 percent by weight $TiO_2$. In another embodiment of the invention, the glass composition of the article includes a solar radiation absorbing and colorant portion having 1 to less than 1.4 percent by weight total iron, about 0.2 to 0.6 percent by weight FeO, greater than 200 to about 500 PPM CoO, about 5 to 70 PPM Se, greater than 200 to about 800 PPM $Cr_2O_3$, and 0 to about 1 percent by weight $TiO_2$. Another glass with this essential absorbing and colorant portion can have amount of the materials of this portion to give a glass having color characterized by a dominant wavelength in the range of about 480 to 510 nanometers, preferably about 490 to 525 nanometers, with an excitation purity of no higher than about 20%, preferably about 5 to 15%.

In one embodiment of the invention, the glass composition of a green colored, infrared and ultraviolet radiation absorbing soda-lime-silica glass article includes a solar radiation absorbing and colorant portion about 0.90 to 2.0 percent by weight total iron, about 0.17 to 0.52 percent by weight FeO, about 40 to 150 PPM CoO, about 250 to 800 PPM $Cr_2O_3$, and about 0.1 to 1 percent by weight $TiO_2$.

In another embodiment a bronze colored, infrared and ultraviolet absorbing glass composition has a luminous transmittance of up to 60 percent. The essential absorbing and colorant portion for the standard soda-lime-silica glass base composition has iron and selenium, and optionally cobalt, as infrared and ultraviolet radiation absorbing materials and colorants. These glasses have a luminous transmittance (LTA) of up to 60 percent and its color is characterized by a dominant wavelength in the range of 560 to 590 nanometers and an excitation purity of 12 to 75 percent at a thickness of 0.160 inches (4.06 millimeters).

In one embodiment of the invention, the glass composition of a bronze colored, infrared and ultraviolet radiation absorbing soda-lime-silica glass article includes a solar radiation absorbing and colorant portion 0.7 to 2.2 percent by weight total iron, 0.15 to 0.5 percent by weight FeO, 3 to 100 PPM Se, and optionally up to 200 PPM CoO, and preferably 1.1 to 1.4 percent by weight total iron, 0.24 to 0.36 percent by weight FeO, 20 to 45 PPM Se, and 0 to 70 PPM CoO.

Another glass composition is a bronze colored, infrared and ultraviolet absorbing glass composition having a luminous transmittance of up to 60 percent. The glass uses a standard soda-lime-silica glass base composition and additionally iron and selenium, and optionally cobalt, as infrared and ultraviolet radiation absorbing materials and colorants. The glass of the present invention has a luminous transmittance (LTA) of up to 60 percent and its color is characterized by a dominant wavelength in the range of 560 to 590 nanometers and an excitation purity of 12 to 75 percent at a thickness of 0.160 inches (4.06 millimeters).

In one embodiment of the invention, the glass composition of a bronze colored, infrared and ultraviolet radiation absorbing soda-lime-silica glass article includes a solar radiation absorbing and colorant portion 0.7 to 2.2 percent by weight total iron, 0.15 to 0.5 percent by weight FeO, 3 to 100 PPM Se, and optionally up to 200 PPM CoO, and preferably 1.1 to 1.4 percent by weight total iron, 0.24 to 0.36 percent by weight FeO, 20 to 45 PPM Se, and 0 to 70 PPM CoO.

These glasses are obtained by melting batch and cullet as noted above in a continuous, large-scale, commercial glass melting and refining operation and formed into flat glass sheets of varying thickness by the float method in which the molten glass is supported on a pool of molten metal, usually tin, as it assumes a ribbon shape and is cooled in a manner well known in the art.

For such a melting operation, sulfur is added to the batch materials of a soda-lime-silica glass as a melting and refining aid. Commercially produced float glass may include up to about 0.3 wt % $SO_3$. In a glass composition that includes iron and sulfur, providing reducing conditions may create amber coloration which lowers luminous transmittance as discussed in U.S. Pat. No. 4,792,536 to Pecoraro, et al. However, it is believed that the reducing conditions required to produce this coloration in float glass compositions of the type disclosed herein are limited to approximately the first 20 microns of the lower glass surface contacting the molten tin during the float forming operation, and to a lesser extent, to the exposed upper glass surface. Because of the low sulfur content and the limited region of the glass in which any coloration could occur, depending on the particular soda-lime-silica-glass composition, sulfur in these surfaces has little if any material effect on the glass color or spectral properties.

It should be appreciated that as a result of forming the glass on molten tin as discussed above, measurable amounts of tin oxide may migrate into surface portions of the glass on the side contacting the molten tin. Typically, a piece of float glass has an $SnO_2$ concentration of at least 0.05 to 2 wt % in the first 25 microns below the surface of the glass that was in contact with the tin. Typical background levels of $SnO_2$ may be as high as 30 parts per million (PPM). It is believed that high tin concentrations in about the first 10 angstroms of the glass surface supported by the molten tin may slightly increase the reflectivity of that glass surface; however, the overall impact on the glass properties is minimal.

The preferred embodiment of the invention involves operating the horizontal continuous melter and refiner at a tonnage rate and with temperature control in melter and controlled cooling in the refiner to provide reduced bubble defects and acceptable ream induced distortion.

One of the challenges in melting and refining a solar performing glass with a high redox value of greater than 0.38 especially with high iron concentration of greater than 0.45 to 1.5 is that the reduced form of iron, ferrous iron, preferably absorbs infrared energy. This is a favorable property in the final product but provides for low effective thermal conductivity in melting. This leads to a higher temperature gradient in the depth of the melted pool of glass than is encountered with lower redox glass melts. Forming ferrous iron during melting and/or refining of the glass melt is accomplished by adding reductants and removing oxidizers from the batch ingredients. For refining of a glass melt in a horizontal continuous melter having overhead fossil fuel firing requires a use of sulfate fining agents which are oxidizers in order to find gaseous inclusions from the melt. Reducing or removing sulfate oxidizing fining agents impedes the fining operation. This dilemma of needing sulfate fining agents which also act as oxidizers but at the same time need to reduce iron from ferric oxide to ferrous oxide to achieve high redox conditions provides a conundrum which can be solved by a particular ratio of the reducing agents to oxidizing agents and proper temperature control in melting and refining along with proper residence time in the melter and the refiner.

In one embodiment of the invention a glass article is produced in a continuous melter and refiner where the glass is highly reduced and has a luminous transmittance (LTA) greater than 71.4%, a total solar energy transmittance (TSET) less than 43.5% a redox ratio of 0.52 to 0.54 and a total iron in the range of 0.51 to 0.52% and having a dominant wavelength of less than or equal to 488 nanometers (nm). The batch composition had a salt cake to "ratio" between 4 and 4.5 and a minimum salt cake level of 7 pounds per 1000 pounds of sand. The batch melted out on the pool of molten glass within a sufficient distance upstream in the melter results from adequate energy supplied by the overhead fossil fuel fired burners present over the batch. In such a horizontal melter for a pool of molten glass the heating scheme utilizing overhead fossil fuel and oxygen and/or air fired burners with or without submerged electric heating electrodes in a region adjacent to where the glass batch materials are charged to the melter are operated to set up various currents within the pool of melted glass. The major molten glass flow streamlines are illustrated in FIG. 2. The spring zone is established in the melter at about the location of maximum glass temperature in the vicinity of the last fired port of the burner. The "spring zone" is a region of upward convective flow in the pool of molten glass. Downstream of the spring zone the convection flow of glass has a return flow stream along the bottom of the melter as illustrated by streamlines in FIG. 2 while upstream of the spring zone there is a return flow. Moving away from the spring zone in a downstream direction for the molten pool of glass is the major flow stream including the throughput component of flow which continues out of the furnace as it is delivered for forming. The upstream melter bottom temperatures in a molten glass pool should be maintained above that for low redox value glass compositions. This assists in providing adequate refining before the glass rises to the surface. The hot spot temperature should be maintained sufficiently high for fining without exceeding the temperature operating limits of the melter superstructure. Also aggressive use of bubblers can enhance the heat transfer through the depth of the pool of molten glass. Also sufficient flow resistance should be used to conserve energy in the melter. The throughput glass preferably is properly cooled from the hot spring zone to the canal such that fine seeds can be completely absorbed and/or eliminated. The glass also should be cooled through the conditioner or conditioning part of the refiner to forming temperatures in such a way as to avoid the formation of Rayleigh roll cells which when formed can result in Rayleigh ream induced distortion. A conditioner exit temperature should be chosen to ensure that the glass at the front and bottom remains above the liquidus temperature of the glass composition. Also it is preferred to utilize cullet and preferably high redox cullet with a redox ratio of greater than 0.38 in an amount of up to 50 weight percent (%) of the material fed to the melter. Alternatively it is possible to utilize up to 20% clear cullet with or without the high redox cullet. With the proper cooling configuration from the waist through the forming entrance from the refiner ream induced distortion resulting from the infrared absorption properties of the reduced glass can be reduced. With a major reduction of the glass temperature entering the waist or through developing an oxidizing atmosphere over the glass in the down tank ports of the overhead fired burners the defect density of bubbles can be reduced. The careful temperature control of the melter and refiner can be accomplished by the placement of thermocouples at the location of the spring zone in the melter and also at the waist entrance from the melter to the refiner and also at the down tank refiner corner bottoms. Also the tonnage can be reduced when using an amount of cullet of around 30% to provide increased residence time for fining. This tonnage reduction is in an amount from around 5 to 25% of the maximum tonnage achievable with the furnace design. For instance, if the furnace can have a tonnage for low redox glass composition of 630 tons per day with the higher redox glass composition the tonnage can be around 550 tons per day.

In operating the horizontal continuous furnace of FIGS. 1 and 2 at 550 tons per day at 50% cullet with the waist resistance located at a depth of 15 inches the following profile for the overhead fossil fuel fired burners can be as follows:

| PORT | % FUEL |
|------|--------|
| 1    | 13.6   |
| 2    | 18.9   |
| 3    | 19.1   |
| 4    | 19–20  |
| 5    | 20.3   |
| 6    | 3.8    |
| 7    | Off    |

To properly control the temperature in the refiner submerged coolers can be used. Also the temperature going into the canal is contolled by properly cooling the throughput glass and providing sufficient front end firing in the refiner.

It is believed that reaminess of the glass would be due to a relatively short period of travel of the throughput stream of glass flowing along the bottom of the furnace. When the throughput stream moves along the bottom of the furnace, it is moving next to a fixed boundary and undergoes relatively high total shear. This shear can possibly attenuate striae in the glass resulting in better ream quality. As can be seen in FIG. 2, the throughput stream flows along the bottom of the furnace for a relatively short length of travel, approximately only about one-third the length of the furnace. In this situation, it is believed this is a insufficient time for the striae to be attenuated and diffused adequately for an acceptable product.

The Rayleigh instabilities in the refiner are controlled. The thermal conductivity (k) of glass depends on the radiation absorption property and its values change in several folds among various glass compositions. As a glass melt temperature decreases (u) (viscosity) increases, but k decreases. In general, the viscosity reduction is much greater than the conductivity increase. To that extent, cooling the glass in the waist for a high redox glass may not reduce the Rayleigh number due to the extremely low conductivity of the high redox glass. The magnitudes of the change in temperature with the depth of the molten pool are dependent on the overhead heat loss from the molten pool. Front end firing in the refiner can compensate for the overhead cooling. Also submerged coolers in the refiner can reduce both the delta t and the depth by cooling hot subsurface glass prior to the onset of Rayleigh instability.

The reduction in bubbles is accomplished from the realization that three types of gaseous inclusions can be of concern in producing high redox glasses. These include seeds, small top bubbles in the molten pool and large open bottom bubbles. With a sufficiently high bulk glass temperature and sufficiently low melter tonnage load the average seeds produced can be as low as 0.0061 per square foot which is an excellent number for any commercial float product.

It is believed without limiting the invention that seed count can be decreased to acceptable levels when the average bottom temperature is increased. Also it is so believed that a higher temperature is required to reduce sulfate solubility to a low level (lower than that required or lower redox glass with sufficient dissolved sulfate or exolution at lower temperatures). Also the higher temperature may account for some increase in Stoke's rise that would move the system in the right direction for seed reduction. In any event, the high bulk glass temperature needs to be increased for the higher redox glass.

Figure 5:
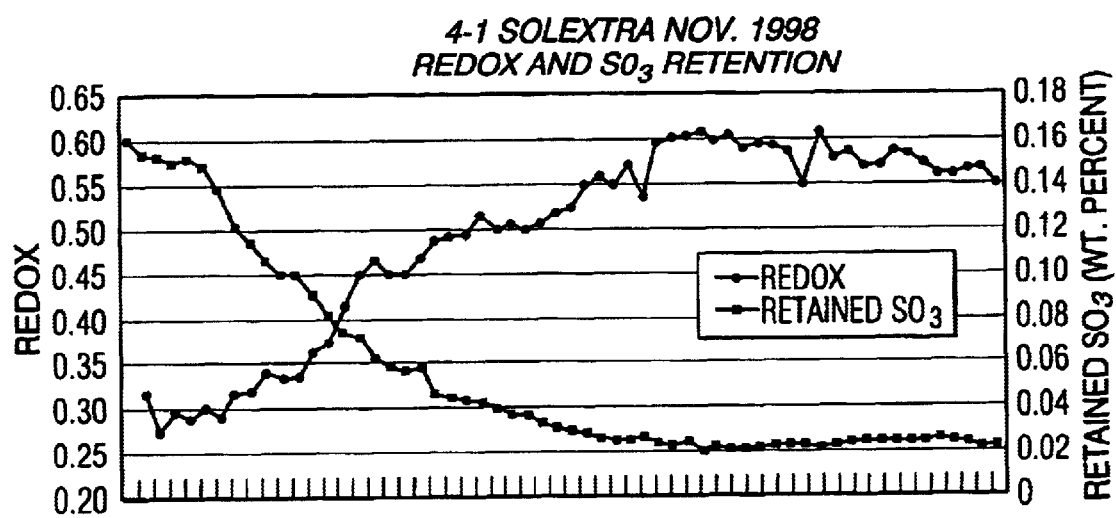
FIG. 5 is a graph of the amount of retained compounds having both sulfur and oxygen measured as $SO_3$ on the right ordinate and the redox ratio on the left ordinate for glass article produced over a period of time.

FIG. 5 shows that the change in sulfate as measured by $SO_3$ retention by X-ray fluorescence spectroscopy in the glass. As the redox increased the sulfate retention decreased to a level of about 0.02% versus a normal of 0.2%. It is believed that the 0.05% sulfate exolution is more or less required for float glass. Working backwards, the dissolved sulfate would have been 0.07% upstream of the spring zone or less than ⅓ the amount available on oxidized (lower redox) glasses. Hence the solubility of sulfate must be decreased dramatically to get the 0.05% exolution needed for fining.

The improvement in seeds can be related to the load on the furnace which not only increases the time available for fining but more importantly allows for achievement of higher bulk glass temperatures. One way of reducing the load is through increasing the cullet rather than a reduction in throughput. A load of 1.15 billion btu per day is achievable at a cullet level of 45% of the feed to the melter. These results show that the time-temperature integral must be greater than normal for a highly reduced glass to that of a oxidized glass or a glass with a lower redox value to compensate for the relatively low amount of dissolved sulfate in the melt.

Figure 6:
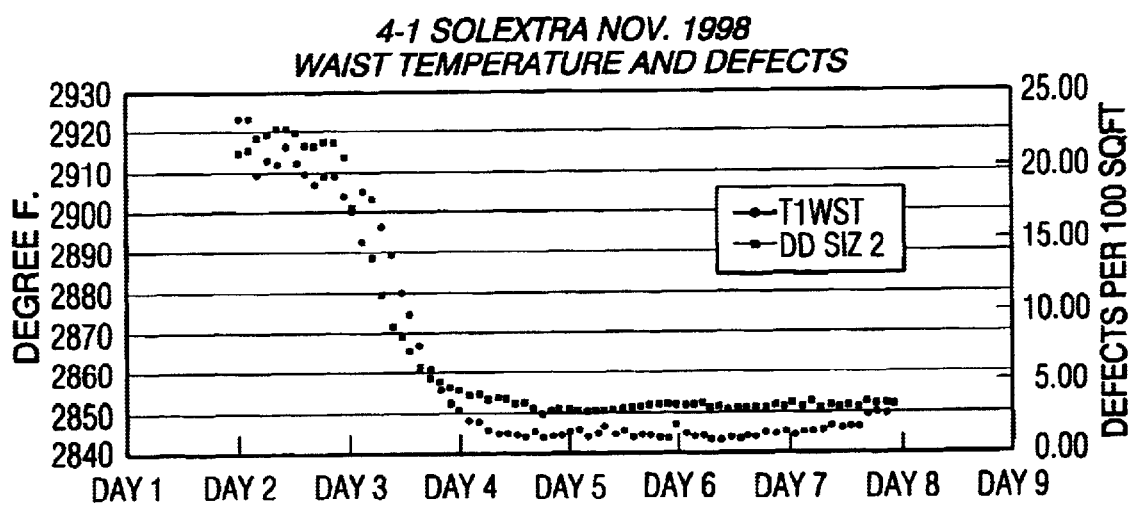
FIG. 6 is a graph of the defects per 100 square feet given on the right ordinate for a glass article produced in a melter and refiner and where the waist temperature is given in the left ordinate over a period of time shown on the abscissa.

Top bubbles which are closed bubbles of 0.25 mm equivalent spherical diameter ("esd") and can contain 85% carbon dioxide and 15% nitrogen with a pressure from 10 to 44 kpa can result from inadequate fining. FIG. 6 shows a decrease in waist temperature decreases sharply the number of top bubbles. When this reduction in temperature was from 2920° Fahrenheit to 2850° Fahrenheit, the reduction in bubbles, it is believed that limiting invention, was a response from controlling the waist surface temperature. Of course the bottom refiner temperature should be controlled to be above the liquidus temperature.

For the higher redox glasses for horizontal furnaces that have a waist cooler there is a waist entrance temperature above which results in the formation in bubbles. There is also a probability that some bubble formation occurs when the refiner bottom temperatures increases. With the highly reduced glasses a very high glass temperature is required for fining and the temperature at the end of the firing zone can be unusually high. But maintaining refiner bottom temperatures above the liquidus temperature of the glass should take into consideration the cooling requirements for the glass, the high waist resistance, and the IR absorbing nature of the glass which tend to lower bottom temperatures.

To control the color and the solar performance properties of the glass the redox level should not exceed 0.6. Exceeding this value can lead to polysulfide formation and increased amber coloration of the glass. The window for maintaining the LTA of both 71.4% is controlled primarily by the level of cobalt in the glass and to a much lesser extent $Fe_2O_3$ levels. Increasing the cobalt level higher than 2–3 ppm over the desired level can lower the LTA to less than 71.4%. Also the dominant wavelength of less than 488 nanometers is controlled by the cobalt level. A typical range for the dominant wavelength for blue glass can be 487.5 to 487.8 nanometers and the higher the cobalt the lower the dominant wavelength. A main batch composition can have a 17.5% caustic soda substitution and sodium nitrate need not be used and salt cake can be the source of sulfate. In producing such a glass color specifications were met and performance specifications were met 88% of the time. The low LTA periods counted for 12% of the time. The stability of the DE was exceptional as indicated by being below 2 Macadam units 92% of the time. TSET was below the 43.5% upper level 100% and the dominant wavelength met the specification 100% of the time.

The relationship between glass redox and the amount of salt cake, coal and cullet additions are that increasing the salt cake or increasing cullet levels requires more coal to be added to obtain a glass redox of higher than 0.45. Less coal on a pound of coal per 1000 pound of sand basis is required to give the proper glass redox as the amount of clear cullet is reduced from 40 to 20%. This is due to the actual increase in coal added on a weight percent batched basis at lower cullet levels. The reducing agent can be coal or OBW or hydrocarbon fuel sprayed on batch materials. Generally, high performance glass compositions have an LTA greater than 70% or 65% outside the United States and a TSET less than 45%.

After the glass has been suitably melted and thermally conditioned, usually for a period of about 12 to 24 hours on a continuous basis, the top surface of the glass is withdrawn from the furnace such as is shown in FIG. 2 for forming. The glass is formed as a continuous ribbon by forming it between water-cooled rolls as it is withdrawn from the furnace. Methods for continuously forming glass by passing it between rolls are well known in the art and a preferred forming embodiment is described in U.S. Pat. No. 3,771,984. Alternatively, other means forming the glass, such as float forming, may be used. After the glass is formed into a continuous ribbon, it usually passes through an annealing lehr to release thermal strains which are introduced into the glass by forming. After annealing, the glass is usually inspected and cut to size.

Figure 7:
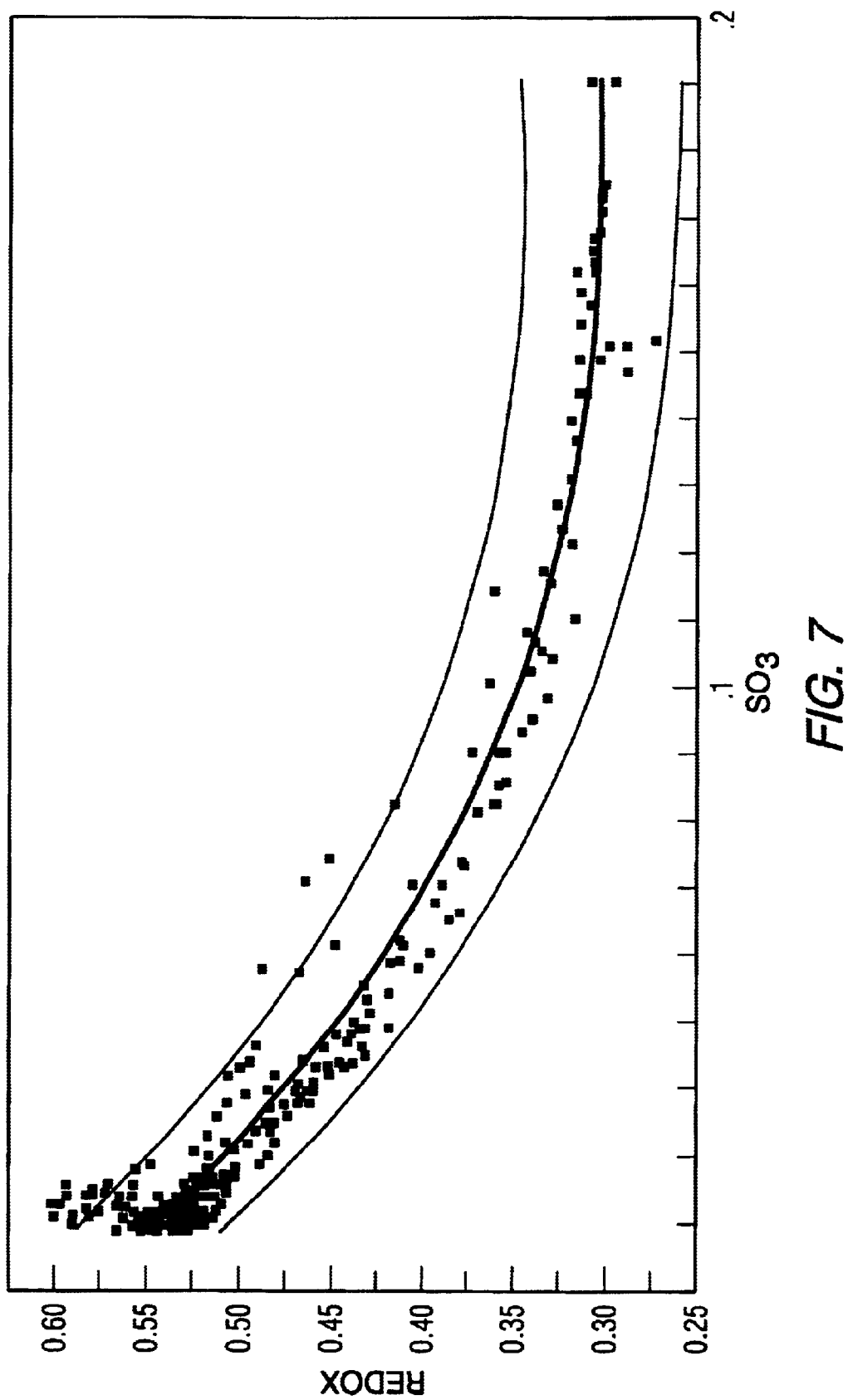
FIG. 7 is a graph of the amount of the retained compounds having both sulfur and oxygen measured as $SO_3$ on the abscissa versus the redox value on the ordinate for glass articles.

FIG. 7 shows a curve of the retained sulfate as SO3 versus redox value where for a redox value of 0.38 the a retained sulfate value can be from around 0.04 to around 0.1. For higher redox values the retained sulfate values would be less. This relationship of the fit to data curves of FIG. 7 using the least square software of JMP from SAS at a 95 percent confidence level gives the formula of iron oxide= 0.62929−4.63871(concentration of $SO_3$)+21.2735 (concentration of $SO_3$)$^2$−31.0386(concentration of $SO_3$)$^3$.

Table 1 illustrates experimental glass melts which embody the principles of the present invention. Similarly, Table 2 illustrates a series of computer modeled glass compositions embodying the principles of the present invention. The modeled compositions were generated by a glass color and spectral performance computer model developed by PPG Industries, Inc. Table 3 illustrates the composition of several glass samples incorporating the principles of the present invention, which were fabricated on a commercial, conventional, overhead fired continuous glass melter of the type disclosed earlier. Only the iron and cobalt portions of the compositions are listed in Tables 1 and 3 while Table 2 includes the iron, cobalt and chromium portions of the compositions. Tables 4–6 list the spectral properties of the compositions shown in Tables 1, 2 and 3 at reference thicknesses of 0.084 inches (2.13 mm), 0.154 inches (3.9 mm) and 0.223 inches (5.66 mm), respectively.

With respect to the data provided in Tables 4–6 for Examples 1–16 of Table 1 and Examples 30–34 of Table 3, the luminous transmittance (LTA) is measured using C.I.E. standard illuminant "A" with a C.I.E. 2° observer over the wavelength range of 380 to 770 nanometers. The solar transmittance (LTS) is measured over the wavelength range of 380 to 770 nm using the C.I.E. 2° observer and the weighting factors specified in ASTM 891-87. Glass color, in terms of dominant wavelength (DW) and excitation purity (Pe), is measured using C.I.E. standard illuminant "C" with a 2° observer, following the procedures established in ASTM E 308-90. The total solar ultraviolet transmittance (TSUV) is measured over the wavelength range of 300 to 400 nanometers, total solar infrared transmittance (TSIR) is measured over the wavelength range of 720 to 2000 nanometers, and total solar energy transmittance (TSET) is measured over the wavelength range of 300 to 2000 nanometers. The TSUV, TSIR and TSET transmittance data is calculated using Parry Moon air mass 2.0 direct solar irradiance data and integrated using the Trapezoidal Rule, as is known in the art. The shading coefficient (SC), which is the ratio of the total solar heat gain for a sample to the total solar heat gain of a nominal 3 mm thick (⅛ inch) clear glass reference, is calculated using the Window 4.1 computer program available from Lawrence Berkeley Laboratory. The spectral properties presented in Tables 4–6 for Examples 17–29 of Table 2 are based on the same wavelength ranges and calculation procedures.

Sample Preparation

The information provided in Table 1 is based on experimental laboratory melts having approximately the following basic batch components:

| | |
|---|---|
| sand | 500 gm |
| soda ash | 162.8 gm |
| limestone | 42 gm |
| dolomite | 121 gm |
| salt cake | 2.5 gm |
| rouge | as required |
| $Co_3O_4$ | as required | was added to each melt to control redox. In preparing the melts, the ingredients were weighed out and blended in a mixer. Half of the material was then placed in a refractory silica crucible and heated to 2650° F. (1454° C.) for 30 minutes. The remaining material was then added to the crucible and heated to 2650° F. (1454° C.) for 1.5 hours. Next, the molten glass was fritted in water, dried and reheated at 2650° F. (1454° C.) for one hour. The molten glass was then fritted a second time in water, dried and reheated to 2650° F. (1454° C.) for two hours. The molten glass was then poured out of the crucible and annealed. Samples were cut from the slab and ground and polished for analysis.

The chemical analysis of the glass compositions was determined using a RIGAKU 3370 X-ray fluorescence spectrophotometer. The FeO content for Examples 1–16 was determined using wet chemistry techniques, as are well known in the art. The FeO content for Examples 30–34 was calculated using the glass color and spectral performance computer model discussed earlier. The spectral characteristics of the glass were determined on annealed samples using a Perkin-Elmer Lambda 9 UV/VIS/NIR spectrophotometer prior to tempering the glass or prolonged exposure to ultraviolet radiation, which will affect the spectral properties as will be discussed later.

The following is representative of the basic oxides of the glasses disclosed in Tables 1 and 3:

| | Ex. 1–16 of Table 1 | Ex. 30–34 of Table 3 |
|---|---|---|
| $SiO_2$ | 73.3 to 73.9 wt % | ~72.5 wt % |
| $Na_2O$ | 13.2 to 13.6 wt % | ~13.8 wt % |
| $K_2O$ | 0.031 to 0.034 wt % | ~0.046 wt % |
| CaO | 8.5 to 8.8 wt % | ~9 wt % |
| MgO | 3.6 to 3.8 wt % | ~3.2 wt % |
| $Al_2O_3$ | 0.12 to 0.16 wt % | ~0.24 wt % |

It is expected that the basic oxide constituents of commercial soda-lime-silica glass compositions based on the experimental melts disclosed in Table 1 and the modeled compositions disclosed in Table 2 would be similar to those discussed earlier.

Although not included in Table 1, analysis of Examples 1–16 indicated up to about 6 PPM $Cr_2O_3$, up to about 30 PPM $MnO_2$ and up to about 0.013 weight percent $TiO_2$. These materials were most likely introduced into the glass composition from the batch raw materials or glass processing equipment. Similarly, although not included in Table 3, analysis of Examples 30–34 indicated up to about 9 PPM $Cr_2O_3$, up to about 26 PPM $MnO_2$ and up to about 0.021 weight percent $TiO_2$. These materials were also most likely introduced into the glass composition from the batch raw materials or glass processing equipment as well as from residual materials in the glass melter. All of the computer modeled compositions in Table 2 were modeled to include 38 PPM $MnO_2$ (not shown in Table 2) and Examples 17–23 were modeled to include 7 PPM $Cr_2O_3$, which are typical detectable levels of chromium and manganese. The chromium and manganese at these levels were included in the modeled compositions to provide a more accurate representation of the glass using the model. It is believed that these amounts of chromium, manganese and titanium in Examples 1–29 of Tables 1 and 2 and the chromium and manganese in Examples 30–34 of Table 3 are tramp and/or residual levels which will not materially affect the color and spectral properties of the glass. The $TiO_2$ level in Examples 30–34, which is believed to be due to residual titanium still in the glass melter, should have only a minimal, if any, affect on the glass color and spectral properties of the glass compositions of the instant invention. Furthermore, it is believed that glass compositions embodying the features of the instant invention may be produced with no or trace levels of $TiO_2$.

TABLE 1

(Experimental Glass Melt Compositions)

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|---|---|---|
| Total Iron (wt %) | 0.591 | 0.607 | 0.613 | 0.616 | 0.629 | 0.632 | 0.637 | 0.641 | 0.659 | 0.661 | 0.664 | 0.671 | 0.679 | 0.699 | 0.717 | 0.720 |
| $Fe_2O_3$ (wt %) | 0.271 | 0.311 | 0.306 | 0.360 | 0.371 | 0.279 | 0.368 | 0.337 | 0.310 | 0.334 | 0.333 | 0.286 | 0.350 | 0.399 | 0.410 | 0.340 |
| FeO (wt %) | 0.288 | 0.266 | 0.276 | 0.230 | 0.232 | 0.318 | 0.242 | 0.274 | 0.314 | 0.294 | 0.298 | 0.258 | 0.296 | 0.270 | 0.276 | 0.342 |
| Redox | 0.487 | 0.438 | 0.450 | 0.373 | 0.369 | 0.503 | 0.380 | 0.427 | 0.476 | 0.445 | 0.449 | 0.385 | 0.436 | 0.386 | 0.385 | 0.475 |
| CoO (PPM) | 13 | 13 | 7 | 12 | 6 | 14 | 6 | 12 | 7 | 6 | 14 | 12 | 6 | 6 | 6 | 6 |

TABLE 2

(Computer Modeled Glass Compositions)

| | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|---|---|---|
| Total Iron (wt %) | 0.45 | 0.50 | 0.55 | 0.75 | 0.80 | 0.90 | 1.0 | 0.50 | 0.50 | 0.50 | 0.55 | 0.55 | 0.55 |
| $Fe_2O_3$ (wt %) | 0.141 | 0.211 | 0.269 | 0.450 | 0.480 | 0.540 | 0.600 | 0.211 | 0.211 | 0.211 | 0.269 | 0.269 | 0.269 |
| FeO (wt %) | 0.278 | 0.260 | 0.253 | 0.270 | 0.288 | 0.324 | 0.360 | 0.260 | 0.260 | 0.260 | 0.253 | 0.253 | 0.253 |
| Redox | 0.58 | 0.52 | 0.46 | 0.36 | 0.36 | 0.36 | 0.36 | 0.52 | 0.52 | 0.52 | 0.46 | 0.46 | 0.46 |
| CoO (PPM) | 5 | 5 | 5 | 5 | 3 | 3 | 3 | 5 | 5 | 5 | 5 | 5 | 5 |
| $Cr_2O_3$ (PPM) | 7 | 7 | 7 | 7 | 7 | 7 | 7 | 25 | 50 | 75 | 25 | 50 | 75 |

TABLE 3

(Production Glass Compositions)

| | Ex. 30 | Ex. 31 | Ex. 32 | Ex. 33 | Ex. 34 |
|---|---|---|---|---|---|
| Total Iron (wt %) | 0.55 | 0.554 | 0.552 | 0.553 | 0.548 |
| $Fe_2O_3$ (wt %) | 0.263 | 0.258 | 0.254 | 0.256 | 0.252 |
| FeO (wt %) | 0.258 | 0.266 | 0.268 | 0.267 | 0.266 |
| Redox | 0.469 | 0.480 | 0.485 | 0.482 | 0.486 |
| CoO (PPM) | 11 | 9 | 9 | 9 | 10 |

TABLE 4

Spectral Properties at 0.084 inches (2.13 mm)

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| LTA (%) | 77.8 | 78.3 | 78.7 | 79.4 | 80.4 | 76.5 | 79.7 | 78.3 | 77.8 | 77.5 | 76.9 | 78.4 |
| LTS (%) | 79.3 | 79.7 | 80.2 | 80.6 | 81.6 | 78.1 | 81.0 | 79.7 | 79.3 | 79.12 | 78.4 | 79.7 |
| TSUV (%) | 69.0 | 68.3 | 68.2 | 66.4 | 65.3 | 68.2 | 65.8 | 66.5 | 67.2 | 67.0 | 66.9 | 65.0 |
| TSIR (%) | 32.9 | 34.5 | 33.2 | 39.4 | 41.1 | 29.0 | 38.0 | 35.5 | 30.4 | 29.8 | 29.7 | 35.8 |
| TSET (%) | 54.0 | 55.0 | 54.4 | 58.1 | 59.2 | 51.3 | 57.3 | 55.6 | 52.5 | 52.0 | 51.9 | 55.7 |
| DW (nm) | 487.1 | 487.2 | 487.7 | 487.7 | 488.8 | 487.3 | 488.4 | 487.5 | 487.8 | 487.8 | 487.2 | 487.9 |
| Pe (%) | 6.30 | 5.98 | 5.86 | 4.99 | 4.33 | 6.78 | 4.85 | 5.64 | 6.18 | 6.31 | 6.51 | 5.30 |
| SC | 0.74 | 0.75 | 0.75 | 0.78 | 0.79 | 0.72 | 0.77 | 0.76 | 0.73 | 0.72 | 0.72 | 0.76 |

| | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|
| LTA (%) | 78.0 | 78.7 | 78.4 | 76.0 | 80.4 | 80.3 | 80.4 | 79.3 | 78.9 | 77.6 | 76.3 | 80.1 |
| LTS (%) | 79.5 | 80.1 | 79.8 | 77.7 | 81.7 | 81.6 | 81.6 | 80.5 | 80.2 | 78.9 | 77.7 | 81.4 |
| TSUV (%) | 65.9 | 64.2 | 63.4 | 65.2 | 75.1 | 72.2 | 69.3 | 61.8 | 60.8 | 58.7 | 56.8 | 72.2 |
| TSIR (%) | 31.8 | 35.1 | 34.4 | 27.0 | 39.4 | 39.6 | 40.4 | 38.3 | 36.2 | 32.4 | 29.0 | 39.5 |
| TSET (%) | 53.3 | 55.3 | 54.7 | 49.8 | 58.8 | 58.7 | 59.1 | 57.1 | 55.7 | 53.0 | 50.5 | 58.6 |
| DW (nm) | 488.0 | 488.6 | 488.7 | 487.9 | 486.4 | 487.0 | 487.8 | 489.9 | 490.3 | 490.2 | 490.1 | 487.4 |
| Pe (%) | 5.85 | 5.15 | 5.13 | 6.67 | 5.28 | 5.02 | 4.59 | 4.14 | 4.25 | 4.78 | 5.31 | 4.96 |
| SC | 0.74 | 0.75 | 0.75 | 0.71 | 0.78 | 0.78 | 0.78 | 0.77 | 0.76 | 0.74 | 0.71 | 0.78 |

| | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|
| LTA (%) | 79.9 | 79.6 | 80.2 | 79.9 | 79.7 | 79.8 | 79.7 | 79.7 | 79.8 | 79.9 |
| LTS (%) | 81.1 | 80.9 | 81.4 | 81.1 | 80.9 | 81.0 | 81.2 | 81.0 | 81.0 | 81.1 |
| TSUV (%) | 72.2 | 72.1 | 69.3 | 69.3 | 69.2 | 66.0 | 66.0 | 66.3 | 66.4 | 66.9 |
| TSIR (%) | 39.5 | 39.5 | 40.4 | 40.4 | 40.4 | 39.8 | 38.8 | 38.6 | 38.8 | 38.9 |

TABLE 4-continued

Spectral Properties at 0.084 inches (2.13 mm)

| | | | | | | | | | | |
|---|---|---|---|---|---|---|---|---|---|---|
| TSET (%) | 58.4 | 58.2 | 58.9 | 58.8 | 58.6 | 58.5 | 57.9 | 57.8 | 57.9 | 58.0 |
| DW (nm) | 487.9 | 488.4 | 488.2 | 488.8 | 489.4 | 488.2 | 488.1 | 488.1 | 488.0 | 488.0 |
| Pe (%) | 4.88 | 4.80 | 4.53 | 4.45 | 4.38 | 4.63 | 4.68 | 4.70 | 4.75 | 4.77 |
| SC | 0.78 | 0.78 | 0.78 | 0.78 | 0.78 | 0.78 | 0.77 | 0.77 | 0.77 | 0.78 |

TABLE 5

Spectral Properties at 0.154 inches (3.9 mm)

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| LTA (%) | 68.3 | 69.0 | 69.7 | 70.7 | 72.3 | 66.2 | 71.3 | 69.1 | 68.2 | 67.9 | 66.8 | 69.1 |
| LTS (%) | 70.7 | 71.3 | 72.1 | 72.8 | 74.3 | 68.8 | 73.4 | 71.3 | 70.7 | 70.4 | 69.3 | 71.3 |
| TSUV (%) | 59.2 | 58.3 | 58.4 | 55.9 | 54.6 | 58.0 | 55.3 | 55.9 | 56.9 | 56.7 | 56.4 | 53.9 |
| TSIR (%) | 14.9 | 16.2 | 15.1 | 20.3 | 21.8 | 12.1 | 19.1 | 17.0 | 13.0 | 12.6 | 12.8 | 17.3 |
| TSET (%) | 40.0 | 40.9 | 40.5 | 43.8 | 45.0 | 37.4 | 43.1 | 41.2 | 38.6 | 38.2 | 38.1 | 41.4 |
| DW (nm) | 486.8 | 486.9 | 487.5 | 487.5 | 488.6 | 487.0 | 488.2 | 487.3 | 487.6 | 487.5 | 486.9 | 487.7 |
| Pe (%) | 11.22 | 10.69 | 10.44 | 8.96 | 7.79 | 12.04 | 8.71 | 10.09 | 10.98 | 11.20 | 11.58 | 9.48 |
| SC | 0.62 | 0.63 | 0.63 | 0.66 | 0.67 | 0.60 | 0.65 | 0.63 | 0.61 | 0.61 | 0.61 | 0.64 |

| | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|
| LTA (%) | 68.7 | 69.7 | 69.2 | 65.5 | 72.4 | 72.2 | 72.4 | 70.6 | 70.0 | 67.9 | 65.8 | 71.9 |
| LTS (%) | 71.0 | 71.8 | 71.4 | 68.1 | 74.5 | 74.3 | 74.3 | 72.5 | 72.0 | 70.0 | 68.1 | 74.0 |
| TSUV (%) | 55.2 | 53.1 | 52.0 | 54.2 | 67.6 | 63.7 | 59.8 | 50.1 | 48.7 | 46.2 | 43.8 | 63.6 |
| TSIR (%) | 14.0 | 16.7 | 16.0 | 10.7 | 20.3 | 20.4 | 21.2 | 19.3 | 17.5 | 14.4 | 11.9 | 20.4 |
| TSET (%) | 39.3 | 41.0 | 40.4 | 36.1 | 44.9 | 44.7 | 44.9 | 42.6 | 41.2 | 38.5 | 36.2 | 44.5 |
| DW (nm) | 487.8 | 488.4 | 488.6 | 487.6 | 486.1 | 486.8 | 487.6 | 489.8 | 490.1 | 490.1 | 490.0 | 487.1 |
| Pe (%) | 10.42 | 9.21 | 9.17 | 11.81 | 9.49 | 9.02 | 8.25 | 7.43 | 7.63 | 8.54 | 9.43 | 8.90 |
| SC | 0.62 | 0.63 | 0.63 | 0.59 | 0.66 | 0.66 | 0.66 | 0.64 | 0.63 | 0.61 | 0.59 | 0.66 |

| | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|
| LTA (%) | 71.5 | 71.1 | 72.1 | 71.6 | 71.2 | 71.5 | 71.2 | 71.3 | 71.4 | 71.5 |
| LTS (%) | 73.6 | 73.1 | 74.0 | 73.6 | 73.2 | 73.4 | 73.2 | 73.3 | 73.4 | 73.5 |
| TSUV (%) | 63.6 | 63.5 | 59.8 | 59.7 | 59.6 | 55.8 | 55.7 | 56.0 | 56.2 | 56.8 |
| TSIR (%) | 20.4 | 20.3 | 21.2 | 21.2 | 21.1 | 20.7 | 19.8 | 19.6 | 19.7 | 19.8 |
| TSET (%) | 44.2 | 43.9 | 44.7 | 44.5 | 44.2 | 44.3 | 43.7 | 43.6 | 43.7 | 43.8 |
| DW (nm) | 487.7 | 488.3 | 488.0 | 488.6 | 489.2 | 488.0 | 487.9 | 487.9 | 487.8 | 487.8 |
| Pe (%) | 8.75 | 8.59 | 8.15 | 7.99 | 7.85 | 8.14 | 8.41 | 8.45 | 8.53 | 8.55 |
| SC | 0.66 | 0.66 | 0.66 | 0.66 | 0.66 | 0.66 | 0.65 | 0.65 | 0.65 | 0.65 |

TABLE 6

Spectral Properties at 0.223 inches (5.5 mm)

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| LTA (%) | 60.1 | 61.0 | 61.9 | 63.2 | 65.2 | 57.6 | 63.9 | 61.1 | 60.1 | 59.7 | 58.3 | 61.2 |
| LTS (%) | 63.2 | 63.9 | 65.0 | 65.8 | 67.7 | 60.8 | 66.6 | 64.0 | 63.2 | 62.8 | 61.4 | 63.9 |
| TSUV (%) | 51.8 | 50.9 | 50.9 | 48.1 | 46.6 | 50.3 | 47.4 | 48.1 | 49.2 | 49.0 | 48.5 | 45.7 |
| TSIR (%) | 7.12 | 7.93 | 7.21 | 10.9 | 11.9 | 5.4 | 9.9 | 8.5 | 5.9 | 5.6 | 5.9 | 8.8 |
| TSET (%) | 32.0 | 32.8 | 32.6 | 35.1 | 36.3 | 29.9 | 34.7 | 33.0 | 31.0 | 30.7 | 30.4 | 33.0 |
| DW (nm) | 486.6 | 486.7 | 487.3 | 487.3 | 488.5 | 486.8 | 488.1 | 487.1 | 487.4 | 487.3 | 486.7 | 487.5 |
| Pe (%) | 15.82 | 15.09 | 14.72 | 12.72 | 11.07 | 16.90 | 12.34 | 14.26 | 15.45 | 15.75 | 16.29 | 13.42 |
| SC | 0.55 | 0.56 | 0.56 | 0.58 | 0.59 | 0.54 | 0.58 | 0.56 | 0.54 | 0.54 | 0.54 | 0.56 |

| | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|
| LTA (%) | 60.6 | 61.9 | 61.3 | 56.7 | 65.4 | 65.1 | 65.3 | 63.0 | 62.3 | 59.6 | 57.1 | 64.8 |
| LTS (%) | 63.6 | 64.6 | 64.1 | 59.9 | 68.1 | 67.8 | 67.8 | 65.5 | 64.8 | 62.3 | 59.9 | 67.4 |
| TSUV (%) | 47.3 | 44.9 | 43.6 | 46.0 | 61.6 | 57.0 | 52.5 | 41.5 | 40.0 | 37.2 | 34.7 | 56.9 |
| TSIR (%) | 6.5 | 8.3 | 7.8 | 4.5 | 10.8 | 10.8 | 1.4 | 10.0 | 8.8 | 6.7 | 5.2 | 10.8 |
| TSET (%) | 31.5 | 32.8 | 32.2 | 28.7 | 36.6 | 36.3 | 36.4 | 33.9 | 32.7 | 30.4 | 28.3 | 36.0 |
| DW (nm) | 487.6 | 488.2 | 488.4 | 487.4 | 485.9 | 486.5 | 487.4 | 489.7 | 490.1 | 490.0 | 489.9 | 486.9 |
| Pe (%) | 14.68 | 13.02 | 12.96 | 16.55 | 13.48 | 12.80 | 11.73 | 10.53 | 10.80 | 12.04 | 13.24 | 12.64 |
| SC | 0.55 | 0.56 | 0.56 | 0.53 | 0.59 | 0.59 | 0.59 | 0.57 | 0.56 | 0.54 | 0.52 | 0.59 |

| | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|
| LTA (%) | 64.2 | 63.7 | 64.9 | 64.3 | 63.8 | 64.1 | 63.8 | 63.9 | 64.0 | 64.2 |
| LTS (%) | 66.8 | 66.3 | 67.4 | 66.9 | 66.3 | 66.6 | 66.3 | 66.4 | 66.6 | 66.8 |

TABLE 6-continued

| Spectral Properties at 0.223 inches (5.5 mm) | | | | | | | | | |
|---|---|---|---|---|---|---|---|---|---|
| TSUV (%) | 56.8 | 56.7 | 52.4 | 52.3 | 52.2 | 48.2 | 48.0 | 48.4 | 48.6 | 49.3 |
| TSIR (%) | 10.8 | 10.8 | 11.4 | 11.4 | 11.4 | 11.1 | 10.4 | 10.3 | 10.4 | 10.4 |
| TSET (%) | 35.6 | 35.3 | 36.1 | 35.7 | 35.4 | 35.6 | 35.1 | 35.1 | 35.2 | 35.3 |
| DW (nm) | 487.5 | 488.1 | 487.8 | 488.5 | 489.1 | 487.9 | 487.7 | 487.7 | 487.7 | 487.6 |
| Pe (%) | 12.39 | 12.16 | 11.56 | 11.33 | 11.11 | 11.57 | 11.93 | 12.0 | 12.11 | 12.14 |
| SC | 0.58 | 0.58 | 0.59 | 0.59 | 0.58 | 0.58 | 0.58 | 0.58 | 0.58 | 0.58 |

Referring to Tables 1–5, the present invention provides a blue colored glass using a standard soda-lime-silica glass base composition and additionally iron and cobalt, and optionally chromium, as infrared and ultraviolet radiation absorbing materials and colorants. In particular, the infrared and ultraviolet radiation absorbing and colorant portion of the glass includes about 0.40 to 1.0 wt % total iron, preferably about 0.50 to 0.75 wt % total iron, and about 4 to 40 PPM CoO, preferably about 4 to 20 PPM CoO. In addition, the composition may include up to 100 PPM $Cr_2O_3$, preferably 25 to 50 PPM. The glass has a redox of greater than 0.35 up to 0.60, preferably from about 0.36 to 0.50. In one embodiment of the invention, the glass has a luminous transmittance (LTA) of at least 55%, a dominant wavelength of between about 485 to 489 nm, preferably 487 to 489 nm. In another embodiment of the invention, glass has a luminous transmittance of at least 65% at a thickness of 0.154 inches and a dominant wavelength of about 485 to 492 nm, preferably about 487 to 489 nm. The glass has an excitation purity of about 3 to 18%. However, it should be appreciated that excitation purity depends on the glass thickness. As a result, it is preferred that glass of the present invention having a thickness of about 0.071 to 0.126 inches (1.8 to 3.2 mm) have a Pe of about 3 to 8%; a thickness of about 0.126 to 0.189 inches (3.2 to 4.9 mm) have a Pe of about 5 to 12%; and a thickness of about 0.189 to 0.315 inches (4.9 to 8 mm) have a Pe of about 10 to 18%.

In another embodiment of the instant, the infrared and ultraviolet radiation absorbing materials and colorants of the glass include about 0.50 to 0.60 wt % total, about 4 to 12 PPM CoO, 0 to about 100 PPM $Cr_2O_3$, and 0 to about 0.50 wt % $TiO_2$, and a redox of about 0.45 to 0.50. In one particular embodiment, the glass includes only trace amounts of $Cr_2O_3$ and up to about 0.021 wt % $TiO_2$. In addition, the glass has a luminous transmittance (LTA) of at least 70%, a TSUV of no greater than 60%, a TSIR of no greater than about 30%, and/or a TSET of no greater than 50% at a thickness of about 0.154 inches. The color of the glass is characterized by a dominant wavelength of between about 487 to 489 nm and an excitation purity of about 7–10%.

Glass compositions as disclosed herein and made by the float process typically range from a sheet thickness of about 1 millimeter to 10 millimeters.

For the vehicle glazing applications, it is preferred that the glass sheets having a composition as disclosed herein have a thickness within the range of 0.071 to 0.197 inches (1.8 to 5 mm). It is anticipated that when using a single glass ply, the glass will be tempered, e.g. for an automotive side or rear window, and when multiple plies are used, the glass will be annealed and laminated together using a thermoplastic adhesive, e.g. an automobile windshield which laminates two annealed glass plies together using a polyvinyl butyral interlayer, wherein at least one of the glass plies is a glass sheet having a composition as disclosed herein. In addition, when the glass is used in selected areas of a motor vehicle, e.g. the windshield and front door windows and in some instances the rear window, it is required that the glass have an LTA of at least 70%. In addition, the glass compositions disclosed in the present invention should have a TSUV of no greater than 60%, preferably no greater than 57%, a TSIR of no greater than about 35%, preferably no greater than about 30%, and/or a TSET of no greater than about 55%, preferably, no greater than about 50% at a thickness of about 0.154 inches.

In architectural glazing applications, there is generally no legal requirement with respect to solar transmittance (LTS) of the glass; however, in the present invention, it is preferred that the glass have an LTS of about 60 to 70%, preferably about 63 to 67% and a shading coefficient of no greater than about 0.70, and preferably no greater than about 0.65 at a thickness of about 0.223 inches.

It is expected that the spectral properties of the glass will change after tempering the glass and further upon prolonged exposure to ultraviolet radiation, commonly referred to as solarization. In particular, it is estimated that tempering and solarization of the glass compositions disclosed herein will reduce LTA, LTS and TSIR by about 0.5 to 1%, reduce the TSUV by about 1 to 2%, and TSET by about 1 to 1.5%. As a result, in one embodiment of the invention, the glass composition has selected spectral properties that initially fall outside the desired ranges previously discussed but fall within the desired ranges after tempering and/or solarization.

It should also be appreciated that since the luminous and solar transmittance (LTA and LTS) is reduced by these conditions, in order to maintain the transmittance above a desired minimum level, the initial LTA or LTS of the glass after production should be sufficiently high so that any losses attributable to tempering and solarization will not reduce the transmittance to an unacceptable level.

Vanadium may be used as a partial or complete replacement for the chromium in the glass compositions of the present invention. More specifically, vanadium, which is expressed herein in terms of $V_2O_5$, imparts a yellow-green color to the glass and absorbs both ultraviolet and infrared radiation at different valence states. It is believed that the 100 PPM $Cr_2O_3$ as discussed above may be completely replaced by about 400 PPM $V_2O_5$.

As discussed earlier, other materials may also be added to the glass compositions disclosed herein to further reduce infrared and ultraviolet radiation transmission and/or control glass color. Inclusion of chromium and manganese has been discussed earlier. It is contemplated that the following materials may also be added to the iron and cobalt containing soda-lime-silica glass disclosed herein:

| | |
|---|---|
| SnO$_2$ | 0 to about 2.0 wt % |
| CeO$_2$ | 0 to about 1.0 wt % |
| TiO$_2$ | 0 to about 0.5 wt % |
| ZnO | 0 to about 0.5 wt % |
| Nd$_2$O$_3$ | 0 to about 0.5 wt % |
| MoO$_3$ | 0 to about 100 PPM |
| NiO | 0 to about 10 PPM |
| Se | 0 to about 3 PPM |

As should be appreciated, adjustment may have to be made to the basic constituents of the glass to account for any coloring and/or redox affecting power of these additional materials.

a retained sulfate value as (SO$_3$) where sulfur has a +6 oxidation state in the range of greater than 0.02 to less than 0.18 weight percent, is essentially free of coloration from inorganic polysulfides, and has an average seed count of no greater than 0.0061 per square foot, the glass produced from melting and refining a batch composition comprising: soda lime silica glass forming batch materials, an essential solar radiation and colorant portion, at least one sulfur-containing fining agent and at least one reducing agent.

2. A solar absorbing flat glass article comprising two opposing major surfaces with a thickness of 1.5 to 12 mm. having an ultraviolet and/or infra red absorbing soda lime float glass composition, wherein the glass composition has a redox value in the range of greater than 0.38 to about 0.6, a retained sulfate value as (SO$_3$) where sulfur has a +6

TABLE 7

SPECTRAL PROPERTIES OF SIEMENS SOLECTRA ® GLASS LAB MELTS
3.9 mm product
0.1535" thickness

| Ref # | Melt # | LTA | TSET | UV auto | TSIR | DW | EP | X | Y | Z | x | y | L* | a* | b* | DC |
|---|---|---|---|---|---|---|---|---|---|---|---|---|---|---|---|---|
| | TARGET | >71.4 | <45.5 | | <489 | | | | | | | | | | | <6.0 |
| Eg. 1 | JB22-3 | 72.7 | 44.3 | 60.2 | 18.44 | 487.92 | 8.6 | 69.76 | 75.25 | 97.07 | 0.2882 | 0.3108 | 89.81 | −8.66 | −4.80 | 3.85 |

| | | Reducing Agent/1000 | GLASS COMPOSITION | | | | | |
|---|---|---|---|---|---|---|---|---|
| Ref # | Melt # | Lbs Sand/Other | Feo | Fe$_2$O$_3$ | REDOX | CoO | Cr$_2$O$_3$ | TiO$_2$ | CeO$_2$ |
| Eg. 1 | TARGET JB22-3 | 85 lbs OBW/ 50% Cullet | 0.234 | 0.545 | 0.429 | 0.0003 | 0.0008 | 0.013 | <0.01 |

*Platinum crucibles were used for these melts
Solextra glass composition as shown produced on Siemens furnace.

TABLE 8

SOLEXTRA ® GLASS LAB MELTS

| | lb/1000 lb sand | | % Clear | Color Model | Wt % | | Total Wt % SO$_3$ | Wt % SO$_3$ Batched from | Estimated Batch | Total % Coal |
|---|---|---|---|---|---|---|---|---|---|---|
| Example | Salt Cake | Coal | Cullet | Redox | Fe$_2$O$_3$ | Wt % SO$_3$ | Batched | Cullet | Redox | Batched |
| 2 | 7.78 | 1.7 | 40 | 0.365 | 0.589 | 0.129 | 0.284 | 0.098 | 0.370 | 0.068 |
| 3 | 7.78 | 2.1 | 40 | 0.427 | 0.587 | 0.092 | | | 0.437 | 0.084 |
| 4 | 7.78 | 2.5 | 40 | 0.475 | 0.585 | 0.077 | | | 0.489 | 0.100 |
| 5 | 7.78 | 2.9 | 40 | 0.543 | 0.587 | 0.065 | | | 0.563 | 0.116 |
| 6 | 7.78 | 1.7 | 30 | 0.381 | 0.581 | 0.113 | 0.296 | 0.075 | 0.386 | 0.081 |
| 7 | 7.78 | 2.1 | 30 | 0.453 | 0.582 | 0.084 | | | 0.463 | 0.100 |
| 8 | 7.78 | 2.5 | 30 | 0.540 | 0.579 | 0.060 | | | 0.555 | 0.119 |
| 9 | 7.78 | 2.9 | 30 | 0.660 | 0.584 | 0.045 | | | 0.682 | 0.138 |
| 10 | 7.78 | 1.3 | 20 | 0.338 | 0.579 | 0.145 | 0.309 | 0.051 | 0.340 | 0.072 |
| 11 | 7.78 | 1.7 | 20 | 0.442 | 0.580 | 0.096 | | | 0.448 | 0.095 |
| 12 | 7.78 | 2.1 | 20 | 0.574 | 0.575 | 0.062 | | | 0.586 | 0.117 |
| 13 | 7.78 | 2.5 | 20 | 0.616 | 0.576 | 0.054 | | | 0.629 | 0.139 |

Conclusion: Need to decrease coal by about 0.3–0.4 lb/1000 lb sand for every 10% decrease in clear cullet for target redox 0.45. This TABLE 8 shows the use of clear cullet with slightly less coal used to make the Solextra glass and achieve the desired redox level at lower cullet levels. These results are also shown in FIG. 7. As shown in the last column of TABLE 8, the total wt. % of coal batched on a glass basis is higher as the cullet decreases for the same level of coal addition expressed on a pound of coal per 1000 pounds of sand basis.

Other variations as are known to those of skill in the art may be resorted to without departing from the scope of the invention as defined by the claims that follow.

What is claimed is:

1. A solar absorbing flat glass article comprising two opposing major surfaces with a thickness of 1.5 to 12 mm. having an ultraviolet and/or infra red absorbing soda lime float glass composition, wherein the glass composition has a redox value in the range of greater than 0.38 to about 0.6, a retained sulfate value as (SO$_3$) where sulfur has a +6 oxidation state in the range of greater than 0.005 to less than 0.18 weight percent, and is essentially free of coloration from inorganic polysulfides, produced from melting and refining a batch composition comprising: soda lime silica glass forming batch materials, an essential solar radiation and colorant portion, at least one sulfur-containing fining agent and at least one reducing agent wherein the weight ratio of the fining agent to reducing agent is in the range of about 2.4 to about 4.5.

3. Article of claim 2 which has an essentially laminar striae through the thickness of the article resulting from a Rayleigh number of 532 or less during refining of the glass melt.

4. Article of claim 2 wherein the redox value is in the range of greater than 0.49 to 0.6.

5. Article of claim 2 which has a retained sulfate value from greater than 0.02 to less than 0.1 weight percent of the glass composition.

6. Article of claim 2 which has a retained sulfate value from greater than 0.02 to less than 0.05 weight percent of the glass composition.

7. Article of claim 2 which has a redox value greater than 0.45 and a retained sulfate value of less than 0.1 weight percent of the glass composition.

8. Article of claim 2 which has a redox value greater than 0.5 and a retained sulfate value of less than 0.06 weight percent.

9. Article of claim 2 which has a redox value greater than 0.55 and a retained sulfate value of less than 0.03 weight percent.

10. Article of claim 2 which has an amount of iron in the composition in the form of $Fe_2O_3$ in the range of about 0.2 to about 4 weight percent and wherein fining agent and the reducing agent are in weight percent and the ratio of the fining agent to the reducing agent is in the range of about 2.4 to about 4.5.

11. Article of claim 2 which has an amount of iron in the composition in the form of $Fe_2O_3$ in the range of about 50 PPM to about 500 PPM.

12. Article of claim 11 wherein the amount of iron in the composition is in the form of $Fe_2O_3$ and is in the range of about 50 PPM to about 250 PPM.

13. Article of claim 12 wherein along with the batch materials, essential solar and colorant portion and fining agent and reducing agent the melting and refining includes cullet having the following composition:

|  | Weight Percent |
| --- | --- |
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |
| $SO_3$ | 0.005 to 0.05 |
| $Fe_2O_3$ | 70 to 150 ppm. |

14. Article of claim 2 which has one or more materials selected from tramp, residual, and trace materials with substantially no affect on the glass color and spectral properties of the glass composition from that of the essential solar radiation and colorant portion of the composition.

15. Article of claim 14 wherein cerium is one of the materials with only a minimal affect on the glass color and spectral properties of the glass composition.

16. Article of claim 14 which has one or more minor colorants that affects the color of the glass article by less than around 5 nanometers for the dominant wavelength according to the CIE scale.

17. Article of claim 16 wherein tin is present as a minor colorant which is present in the glass article that affects the color of the glass article by less than around 5 nanometers for the dominant wavelength according to the CIE scale.

18. Article of claim 2 wherein the glass article has a base composition of:

| $SiO_2$ | about 66 to 75 percent by weight, |
| --- | --- |
| $Na_2O$ | about 10 to 20 percent by weight, |
| CaO | about 5 to 15 percent by weight, |
| MgO | 0 to about 5 percent by weight, |
| $Al_2O_3$ | 0 to about 5 percent by weight, |
| $K_2O$ | 0 to about 5 percent by weight. |

19. Article of claim 2 having a luminous transmittance (LTA) of up to about 73 percent at a thickness of 4 mm.

20. A solar absorbing flat glass article comprising two opposing major surfaces with a thickness of 1.5 to 12 mm. having an ultraviolet and/or infra red absorbing soda lime float glass composition, wherein the glass composition has a redox value in the range of greater than 0.38 to about 0.6, a retained sulfate value as ($SO_3$) where sulfur has a +6 oxidation state in the range of greater than 0.005 to less than 0.18 weight percent, and is essentially free of coloration from inorganic polysulfides, produced from melting and refining a batch composition comprising: soda lime silica glass forming batch materials, an essential solar radiation and colorant portion, at least one sulfur-containing fining agent and at least one reducing agent wherein the weight ratio of the fining agent to reducing agent is in the range of about 2.4 to about 4.5, and an amount of cullet to form a molten glass in the range of 25 to 75 weight percent of the batch composition.

21. A solar absorbing flat glass article comprising two opposing major surfaces with a thickness of 1.5 to 12 mm. having an ultraviolet and/or infra red absorbing soda lime float glass composition, wherein the glass composition has a redox value in the range of greater than 0.38 to about 0.6, a retained sulfate value as ($SO_3$) where sulfur has a ±6 oxidation state in the range of greater than 0.005 to less than 0.18 weight percent, and is essentially free of coloration from inorganic polysulfides, and an essential colorant portion selected from the group of:

| I) total iron | about 0.60 to 4 percent by weight, |
| --- | --- |
| FeO | about 0.23 to 2.4 percent by weight, |
| CoO | about 40 to 500 PPM, |
| Se | about 5 to 70 PPM, |
| $Cr_2O_3$ | about 15 to 800 PPM, |
| $TiO_2$ | about 0.02 to 1 percent by weight, for a green colored, infrared and ultraviolet radiation absorbing glass composition and | green colored, infrared and ultraviolet radiation absorbing glass composition and II) total iron about 0.40 to 1.0 percent by weight

| II) total iron | about 0.40 to 1.0 percent by weight |
| --- | --- |
| CoO | about 4 to 40 PPM |
| $Cr_2O_3$ | 0 to about 100 PPM, for a blue colored, infrared and ultraviolet radiation absorbing glass composition; and | infrared and ultraviolet radiation absorbing glass composition; and

III) total iron 0.9 to 2 percent by weight,

| III) | total iron | 0.9 to 2 percent by weight, |
|---|---|---|
| | FeO | 0.34 to 1.2 percent by weight, |
| | CoO | 90 to 250 PPM, |
| | Se | 0 to 12 PPM, and |
| | TiO$_2$ | 0 to 0.9 percent by weight, for a blue colored, infrared and ultraviolet radiation absorbing glass composition; and |

TiO$_2$ 0 to 0.9 percent by weight, for a blue colored, infrared and ultraviolet radiation absorbing glass composition; and IV) total iron 0.7 to 2.2 percent by weight,

| IV) | total iron | 0.7 to 2.2 percent by weight, |
|---|---|---|
| | FeO | 0.266 to 1.32 percent by weight, |
| | Se | 3 to 100 PPM, and |
| | CoO | 0 to less than 100 PPM, for a bronze colored, infrared and ultraviolet radiation absorbing glass composition; and | colored, infrared and ultraviolet radiation absorbing glass composition; and

V) total iron about 0.90 to 2.0 percent by weight

| V) | total iron | about 0.90 to 2.0 percent by weight |
|---|---|---|
| | FeO | about 0.34 to 1.2 percent by weight, |
| | CoO | about 40 to 150 PPM, |
| | Cr$_2$O$_3$ | about 250 to 800 PPM, and |
| | TiO$_2$ | about 0.1 to 1 percent by weight, for a | green colored, infrared and ultraviolet radiation absorbing glass composition, wherein the glass article is produced from melting and refining a batch composition comprising: soda lime silica glass forming batch materials, an essential solar radiation and colorant portion, at least one sulfur-containing fining agent and at least one reducing agent.

22. Article of claim 21 wherein all percentages are based on the weight percent of the total glass composition and for the article with the essential colorant portion of Group (III) the glass article has a 4.0 mm thickness and a dominant wavelength in the range of 477–494 nm and a purity of excitation in the range of 6–40%.

\* \* \* \* \*